Oct. 5, 1937.　　　G. O'CONNOR ET AL　　　2,095,151
MOLD CONVEYER
Filed June 10, 1935　　　13 Sheets-Sheet 2

Inventors
George O'Connor
William Morley
Charles E. Schoelm
by Parker & Carter
Attorneys.

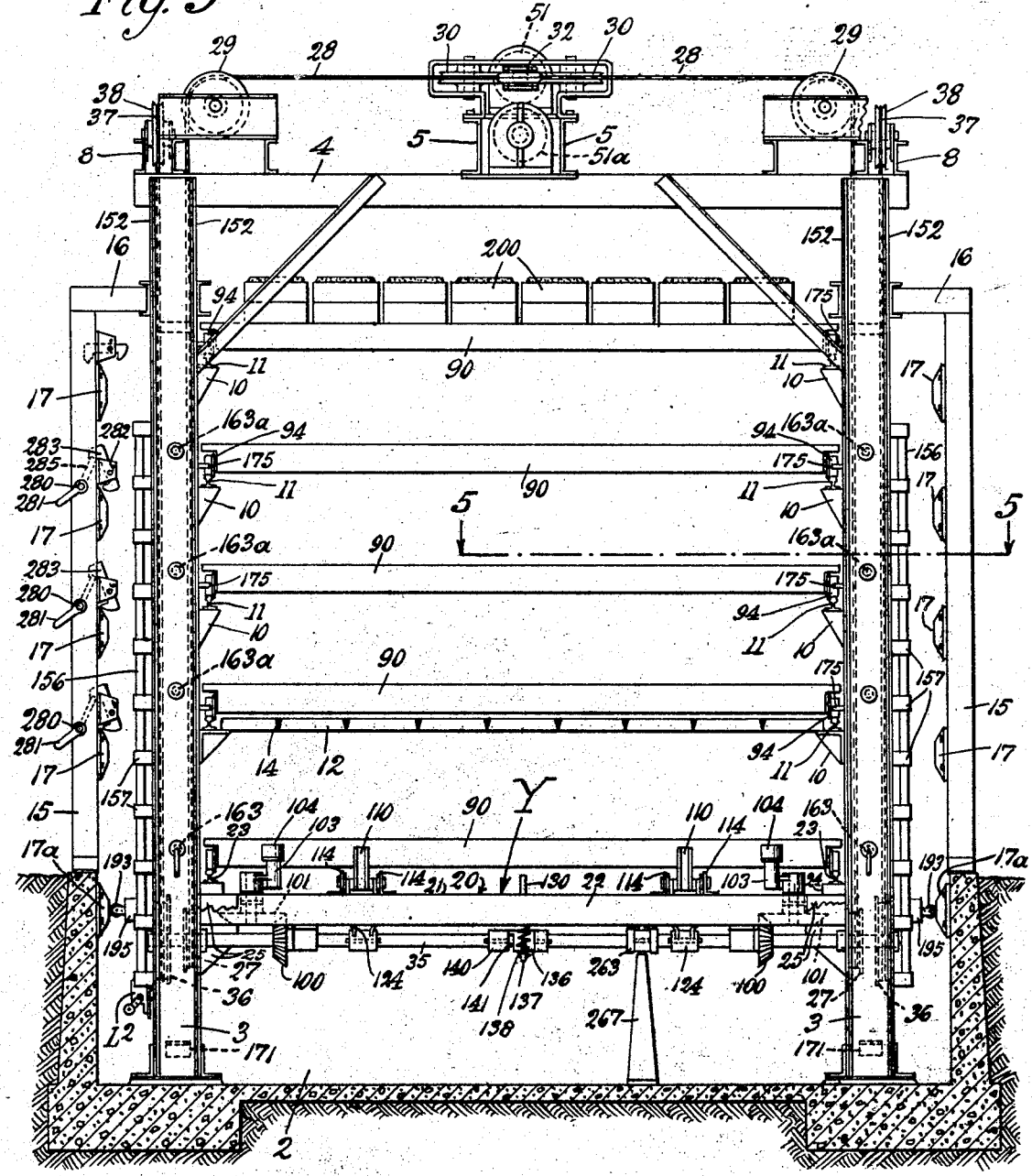
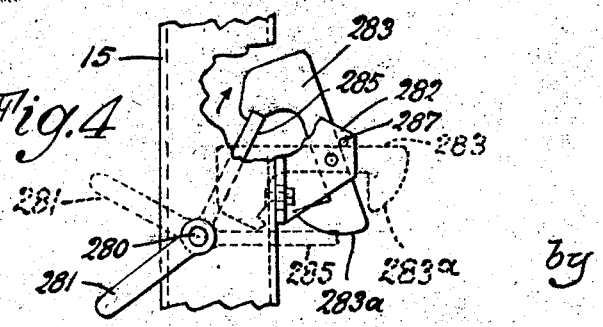

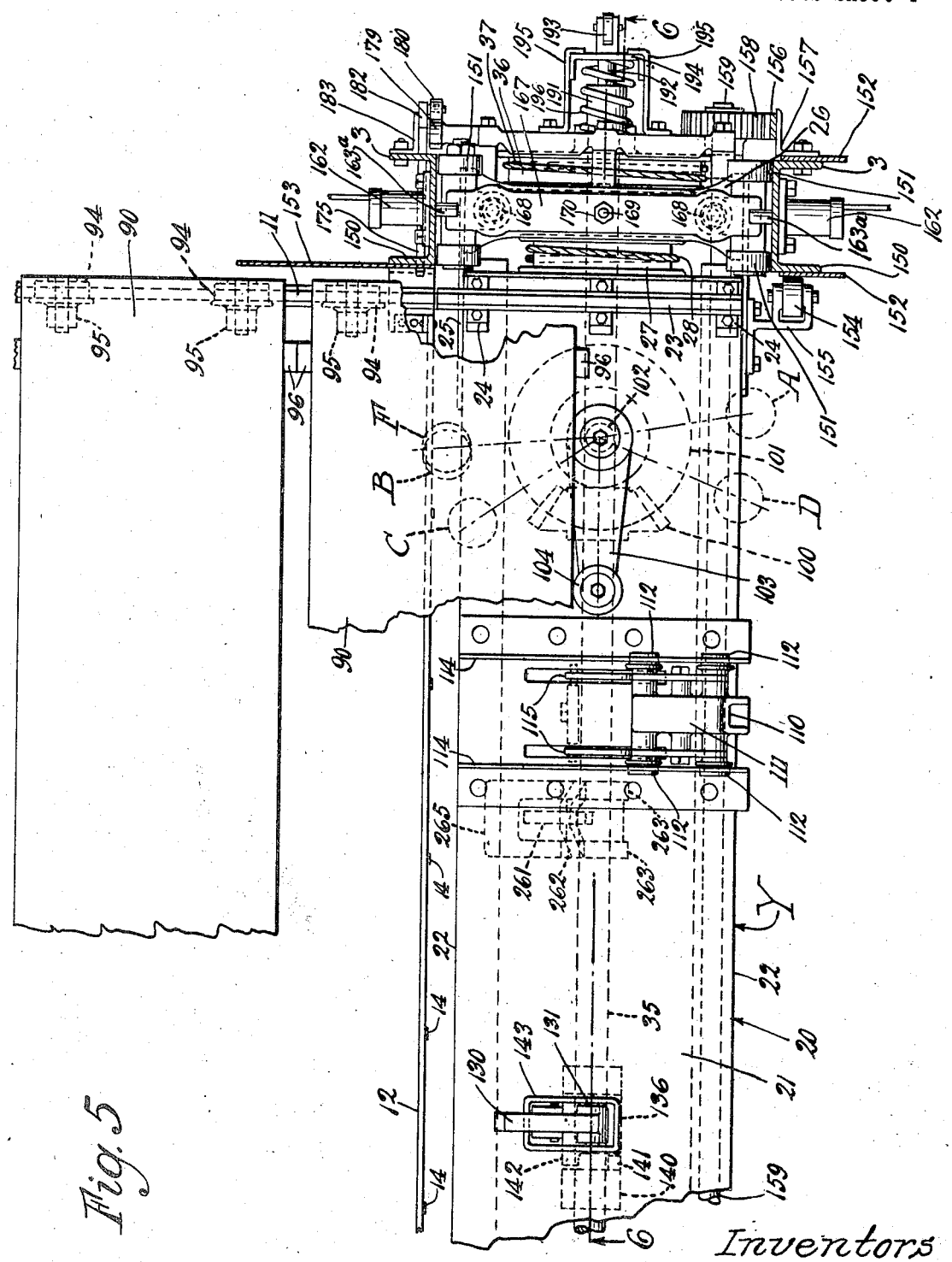

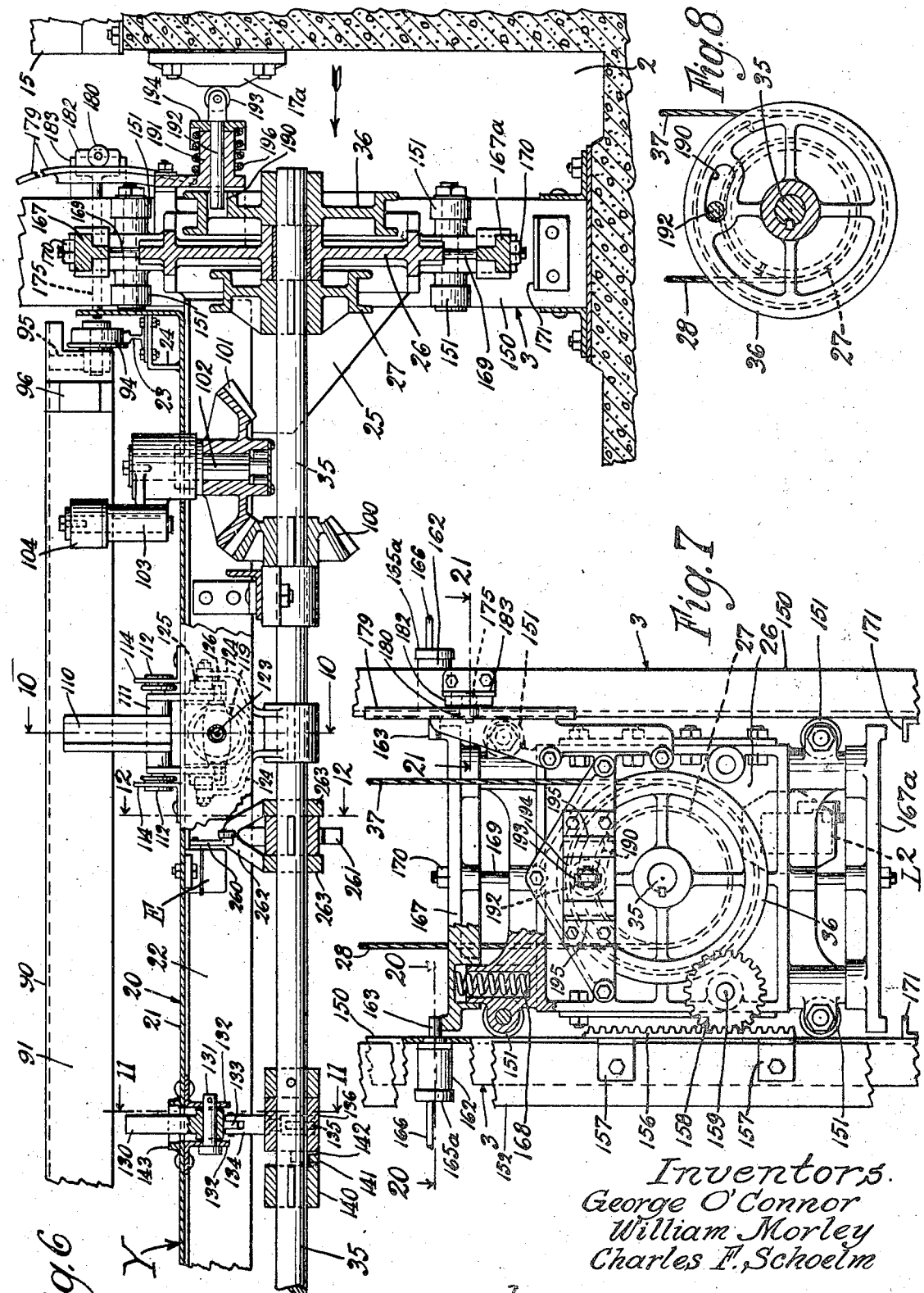

Oct. 5, 1937.  G. O'CONNOR ET AL  2,095,151
MOLD CONVEYER
Filed June 10, 1935  13 Sheets-Sheet 6

Inventors.
George O'Connor
William Morley
Charles F. Schoelm
by
Parker & Carter
Attorneys.

Oct. 5, 1937.  G. O'CONNOR ET AL  2,095,151
MOLD CONVEYER
Filed June 10, 1935  13 Sheets-Sheet 7
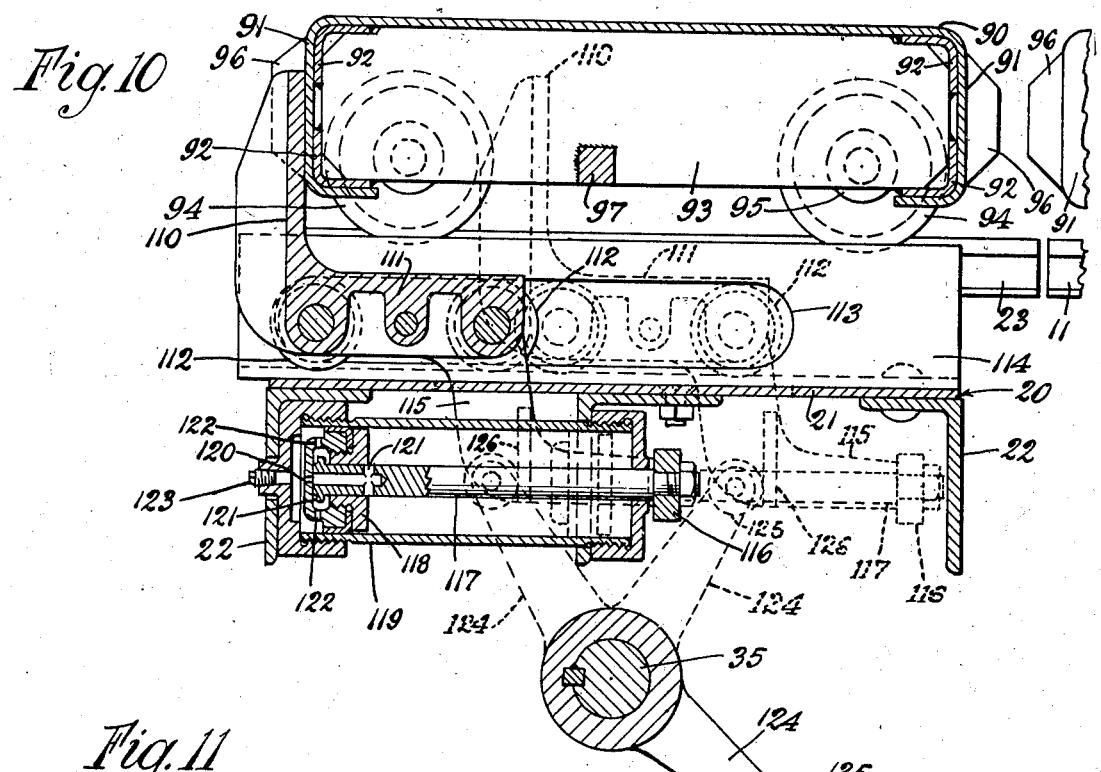
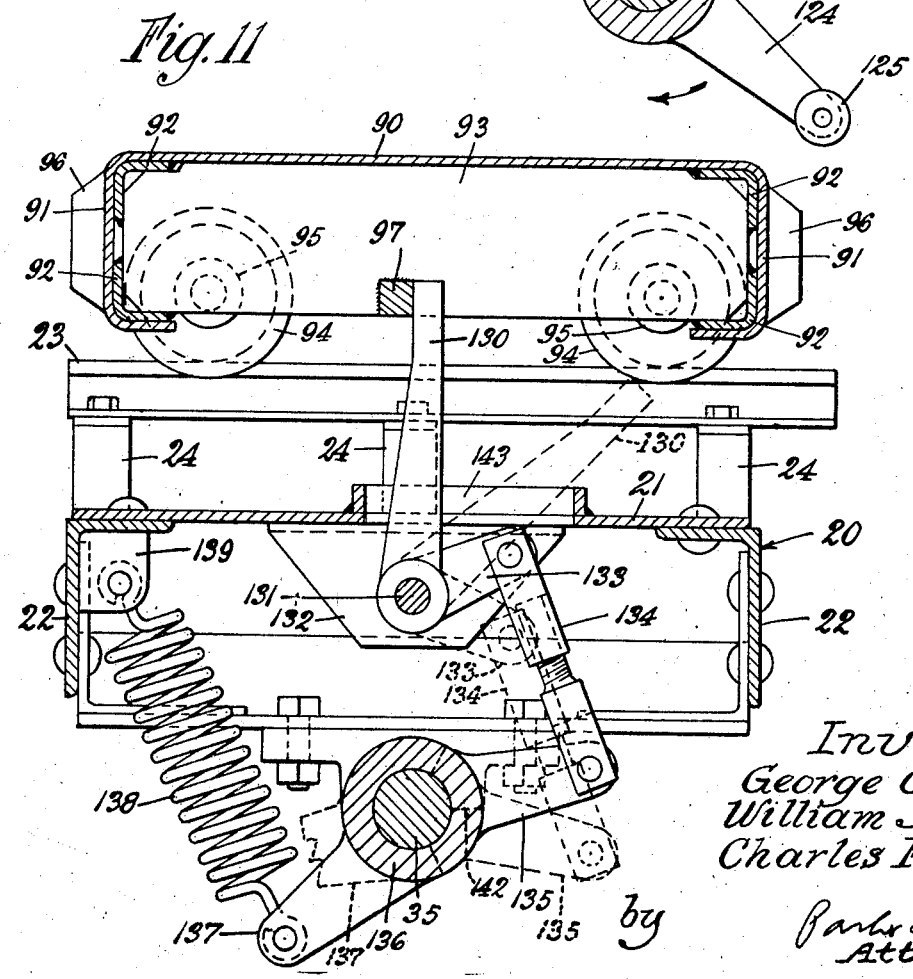
Inventors
George O'Connor
William Morley
Charles F. Schoelm
by
Barber & Carter
Attorneys.

Oct. 5, 1937.   G. O'CONNOR ET AL   2,095,151
MOLD CONVEYER
Filed June 10, 1935   13 Sheets-Sheet 8

Inventors
George O'Connor
William Morley
Charles F. Schoelm
by Parker Carter
Attorneys

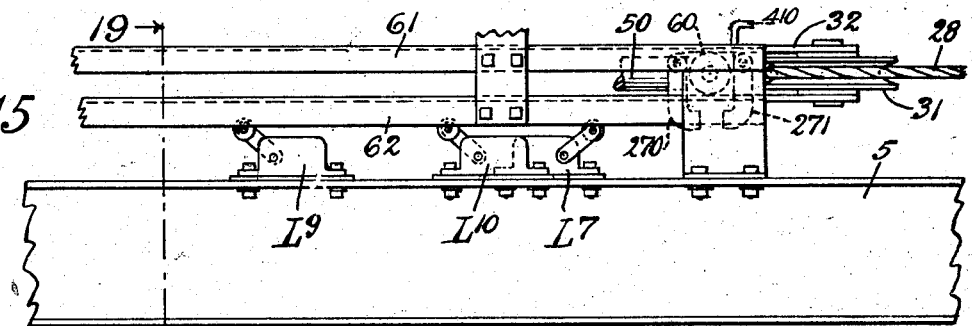
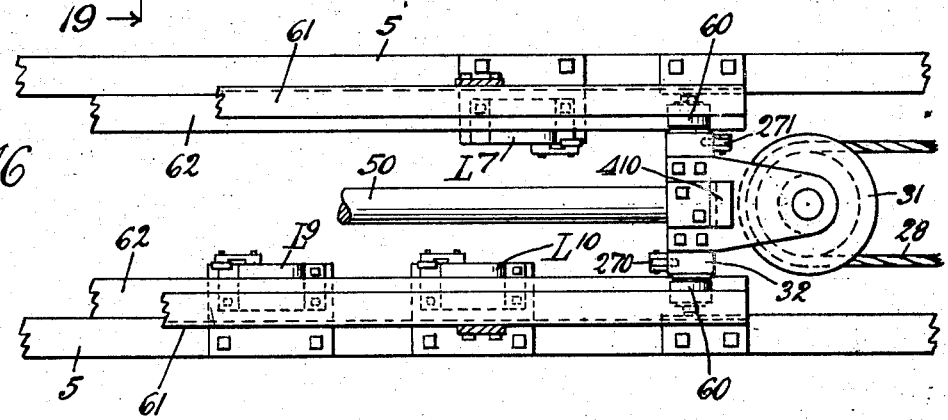
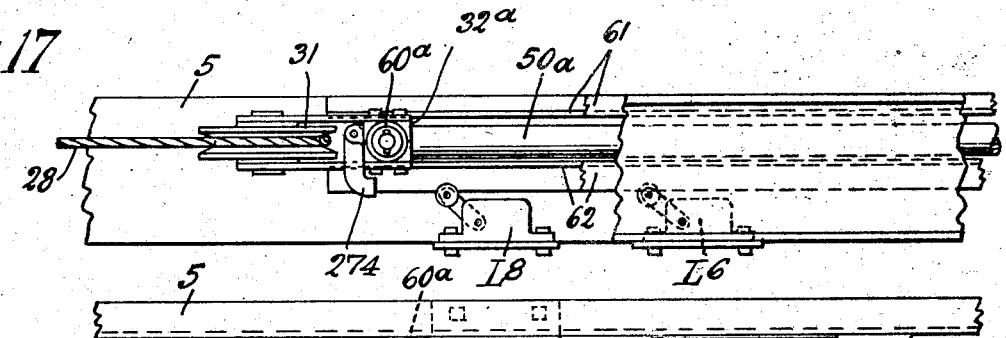
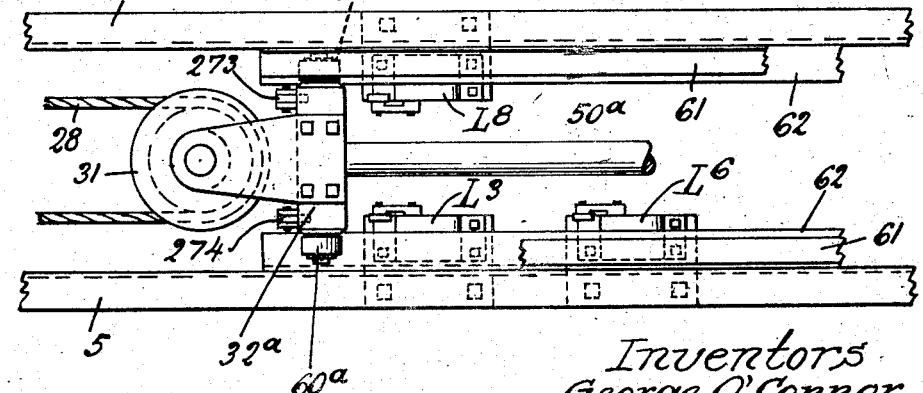

Oct. 5, 1937.　　　G. O'CONNOR ET AL　　　2,095,151
MOLD CONVEYER
Filed June 10, 1935　　　13 Sheets-Sheet 10
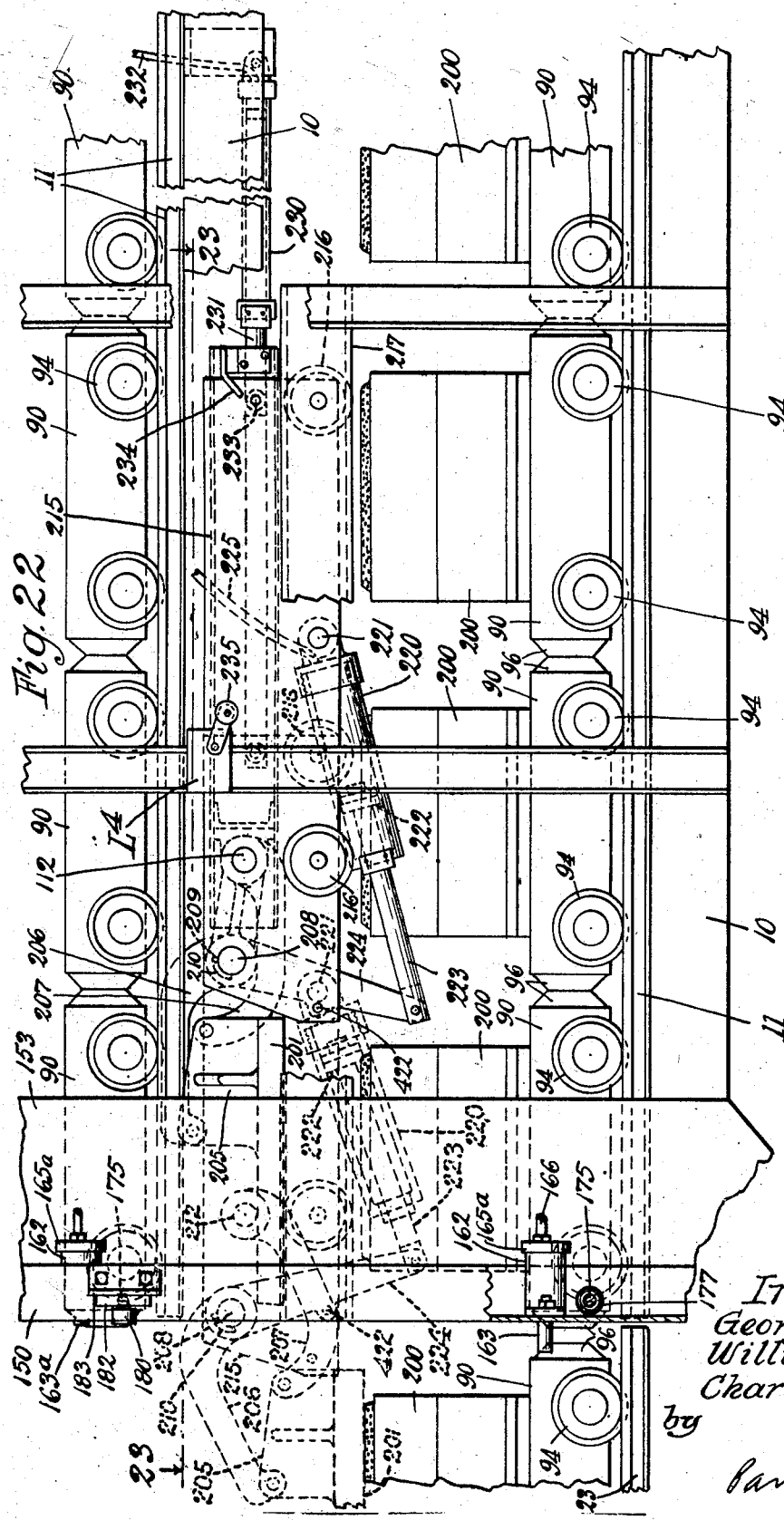
Inventors
George O'Connor
William Morley
Charles F. Schoelm
by
Parker Carter
Attorneys.

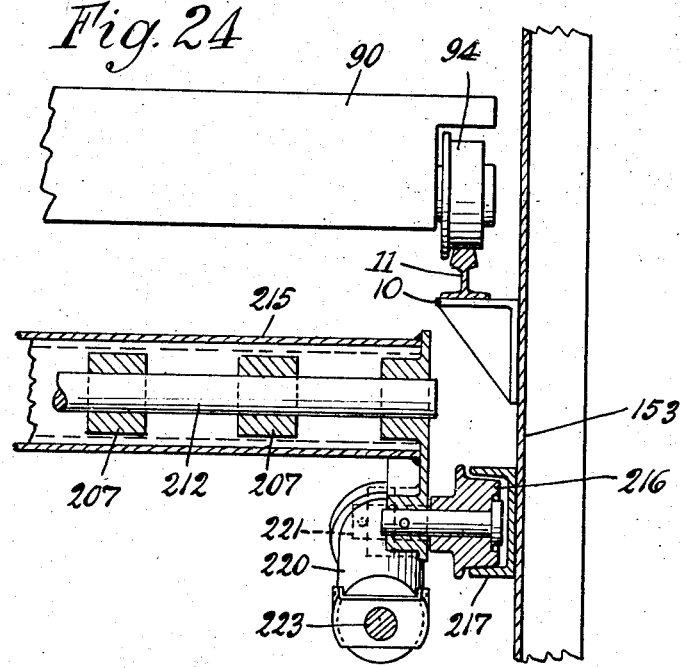
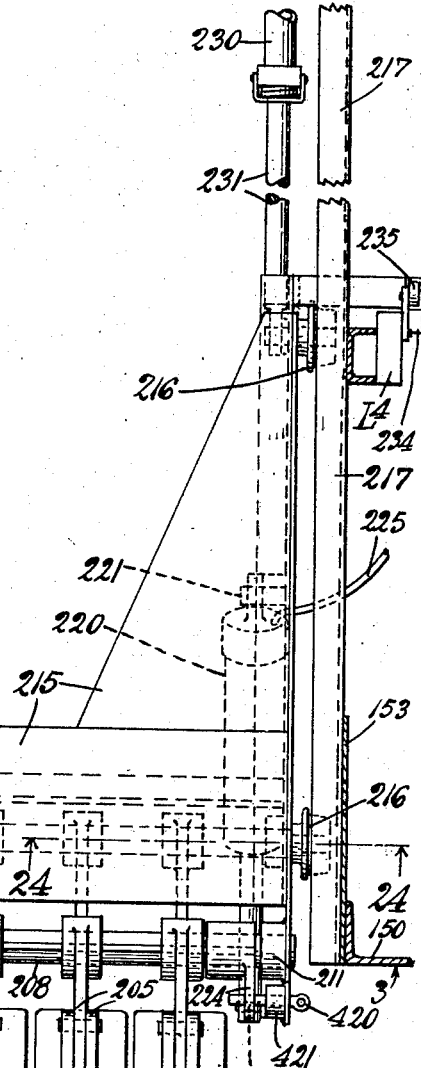
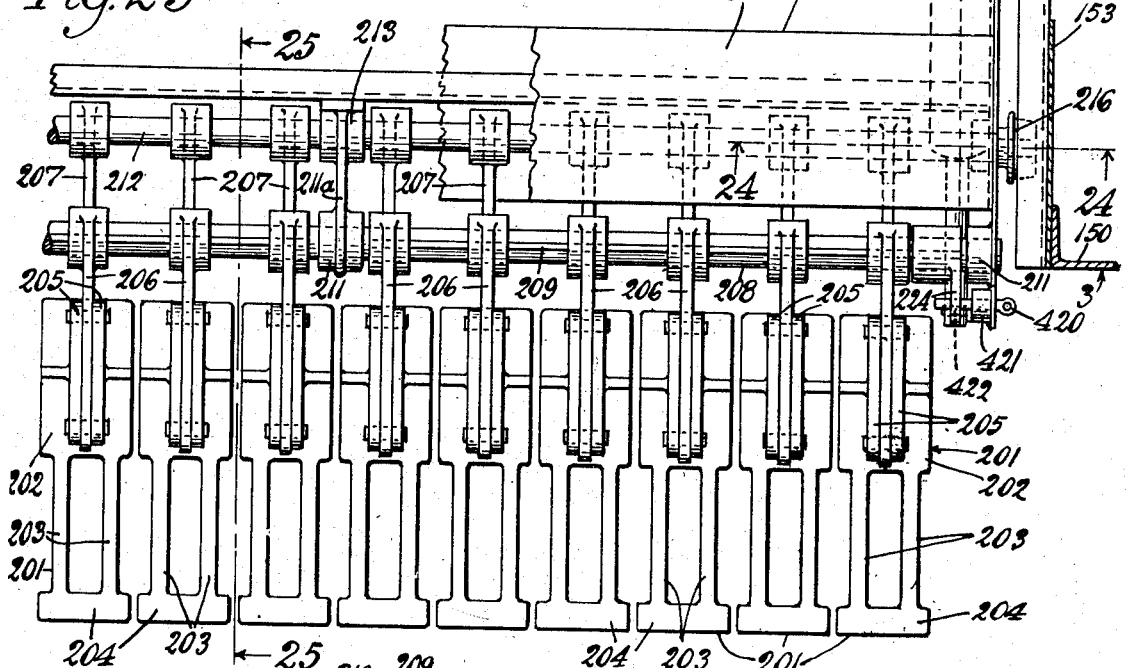

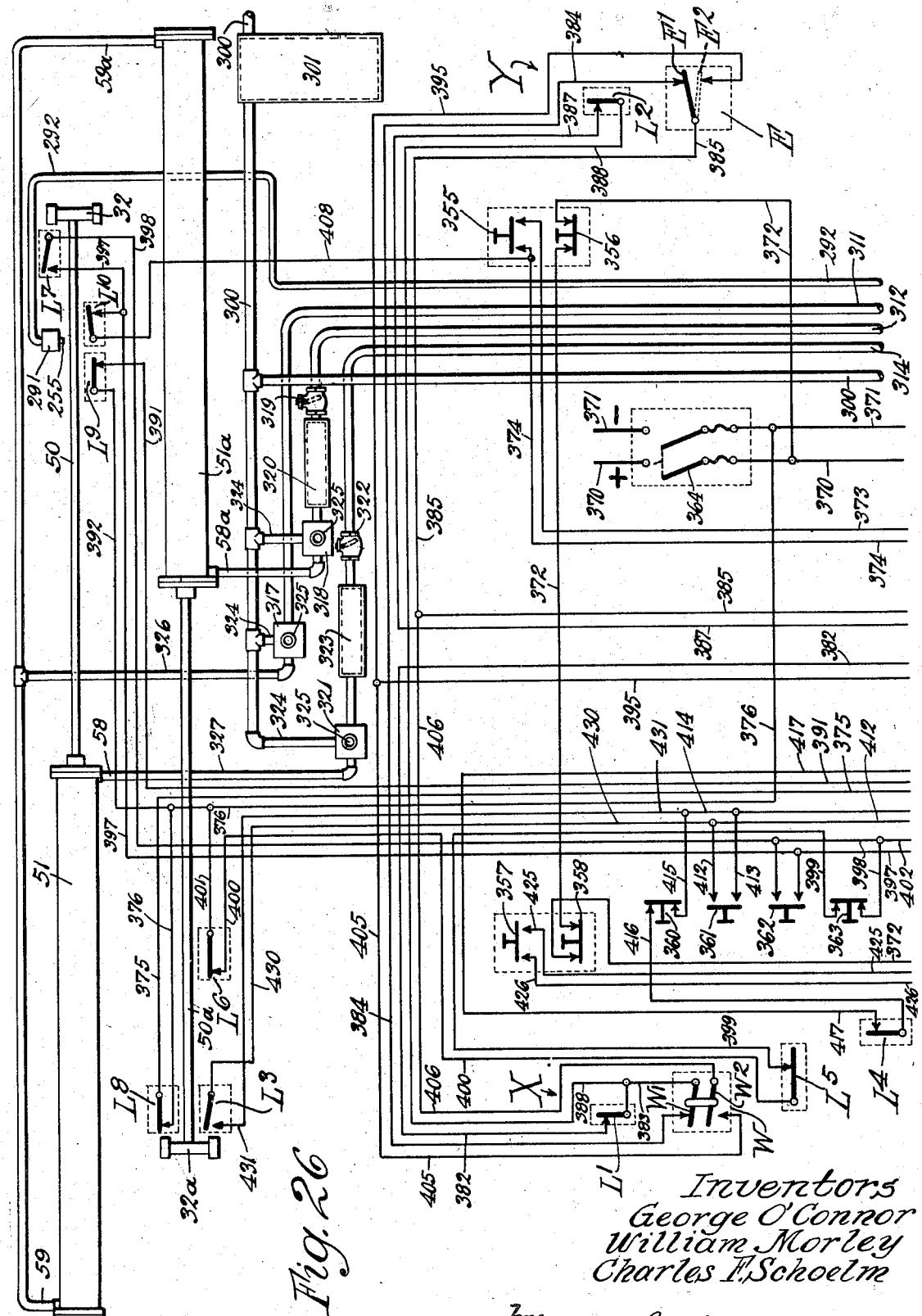

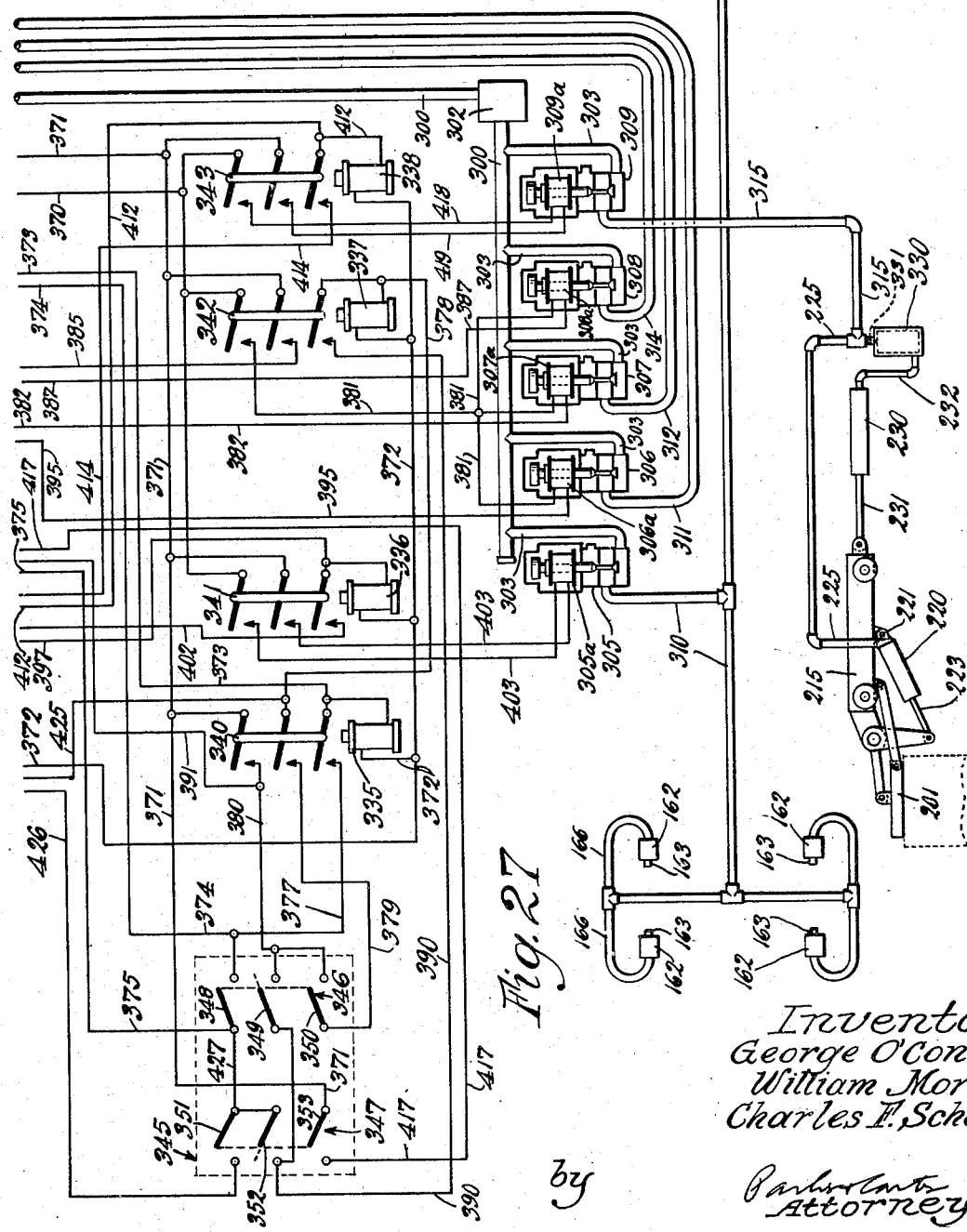

Patented Oct. 5, 1937

2,095,151

UNITED STATES PATENT OFFICE 2,095,151

MOLD CONVEYER

George O'Connor, William Morley, and Charles F. Schoelm, Chicago, Ill., assignors to Link-Belt Company, Chicago, Ill., a corporation of Illinois Application June 10, 1935, Serial No. 25,742

19 Claims. (Cl. 22—20)

This invention relates to an improvement in mold conveyers and mold handling methods and has for one object the provision of an improved mold conveyer which is adapted for the conveying of molds both before and after pouring and for the storing of molds after they have been made and before they have been poured. Another object is the provision of means for concentrating, in a relatively small ground area, a large number of molds and mold supporting trays, adapted for handling and storing molds after their formation by the molder; also during and after the pouring of the mold. Another object is the provision of automatic means for controlling the circulation of the molds, the bands, and follow boards, and of mold supporting and conveying means. Another object is the provision of an automatic control system for raising and lowering the molds and bands and follow boards and the mold supporting means to serve the storing tiers at various levels for storing, removing from storage, pouring and after pouring. Another object is the provision of means for permitting the employment of a mold storage and conveying system both for the formed molds and the poured molds, and also the bands and follow boards after the molds have been shaken out. Another object is the provision of improved means for controlling the delivery of molds to various storage levels and the removal of molds from various storage levels. Another object is the provision of improved means for raising and lowering said molds and mold supporting means. Another object is the provision of improved means for maintaining pressure on the tops of unpoured molds for a predetermined time after they have been poured. It will be understood that flasks might be placed on the conveyer but preferably, in the employment of the present mechanism and method, flasks are used only when the molds are being made up and then removed. The molds are then held in place by slipping a steel or wood band over the sides of the mold to hold the cope and drag together until after the molds are poured. Then the molds are shaken out of the retaining bands. The retaining bands can be slipped on the molds just as soon as the flasks are removed or they can be slipped on the molds just prior to their being poured. Flasks can be used, instead of retaining bands, but they are more expensive than retaining bands.

Other objects will appear from time to time in the course of the specification and claims.

I illustrate my invention more or less diagrammatically in the accompanying drawings, wherein—

Figure 3 is an end elevation illustrating the molding end of the device with parts in section and the molding elevator shown at the lowest level.

Figure 4 is a detail of the tripper mechanism employed in connection with the structure of Figure 3;

Figure 5 is a partial plan view of the molding end, section taken at the line 5—5 of Figure 3, with the molding elevator at one of the upper levels, showing a tray being discharged;

Figure 6 is a section along the line 6—6 of Figure 5, with the molding elevator at the lowest level as in Figure 3;

Figure 7 is an end view taken in the direction of the arrow illustrated at the right hand end of Figure 6;

Figure 8 is a detail of part of the structure shown in Figures 6 and 7;

Figure 10 is a section taken along line 10—10 of Figure 6;

Figure 11 is a section along the line 11—11 of Figure 6;

Figure 15 is a side elevation of the upper structure showing switches and operating levers on the molding end;

Figure 16 is a plan view of the structure shown in Figure 15;

Figure 17 is a side elevation of the upper structure, showing the switches and operating levels on the pouring end;

Figure 18 is a plan view of the structure shown in Figure 17;

Figure 22 is a side elevation of part of the lower structure, showing the mold weights for directing pressure upon the molds;

Figure 23 is a section on the line 23—23 of Figure 22;

Figure 24 is a section on the line 24—24 of Figure 23;

Figure 25 is a section on the line 25—25 of Figure 23;

Figures 26 and 27, taken together, form a wiring diagram of the electrical connections employed in the device;

Figure 28 is a diagrammatic showing of the molding operation; and

Figure 29 is a diagrammatic showing of the pouring operation.

Like parts are indicated by like symbols throughout the specification and drawings.

Figure 1:
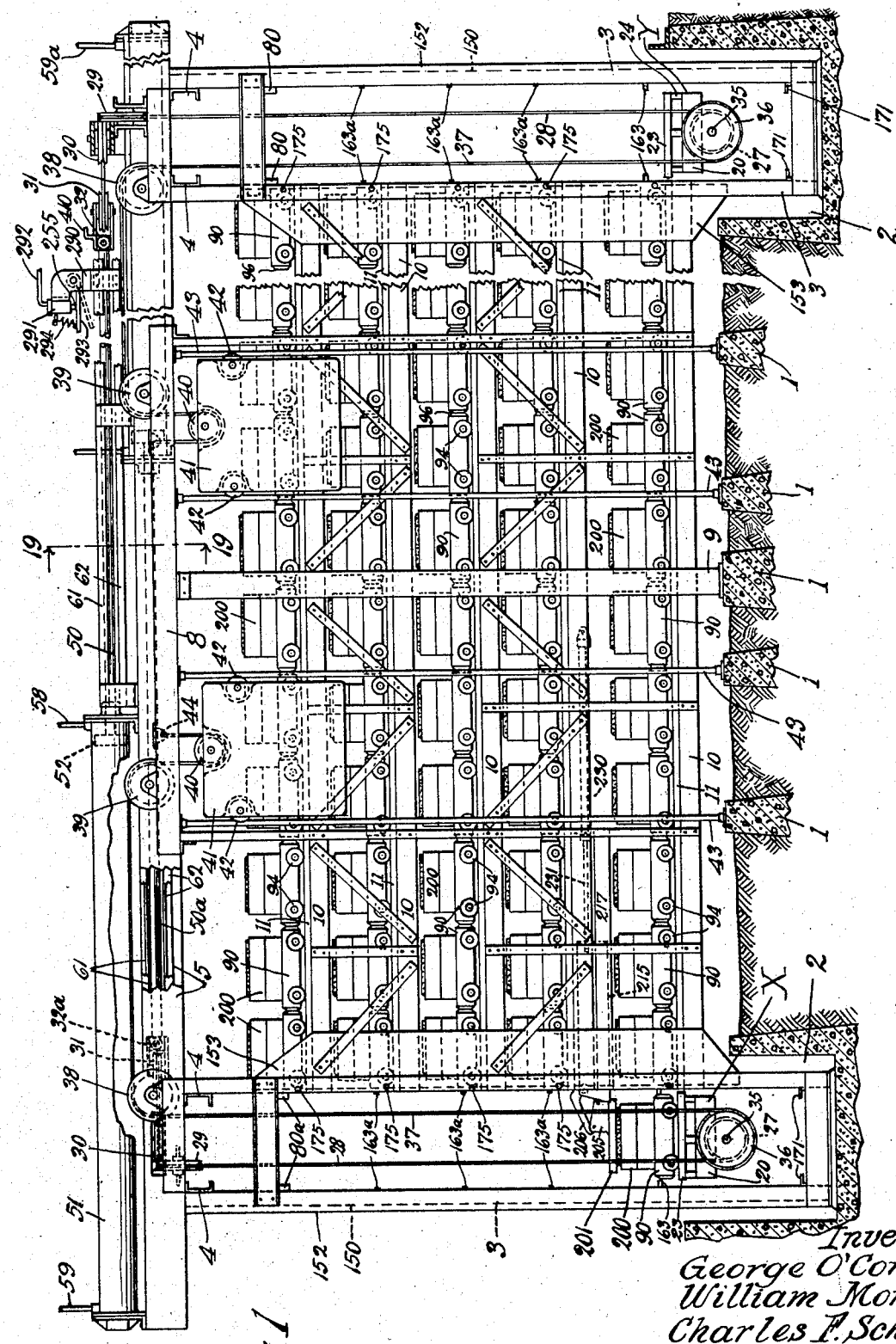
Figure 1 is a side elevation with parts omitted, parts broken away and parts in section.

Referring to the drawings, and to the general structure of the device and particularly to Figure 1, 1 indicates any suitable concrete supports for the intermediate supporting members or frame members of the device; 2 indicates elevator wells or pits at the end of the device which extend entirely across the ends of the device as shown, for example, in Figure 3. We illustrate, for example, corner frame work pillars generally indicated as 3. These side pillars support at their tops end cross frames 4 which in turn support an endwise extending heavy frame indicated as 5. Other intermediate cross pieces 6 may be employed which may be connected to each other and to the cross structures 4 by inclined braces 7. Mounted upon these are the counterweight supports 8 in the form of longitudinally extending frame members which may be supported upon any suitable vertical supports 9 which may be of varying size and shape. 10 indicates track supports mounted on the various uprights 3 and 9 and 11 indicates tracks extending from end to end of the device and mounted upon the members 10. It will be observed from Figure 3 that there are pairs of tracks 11 located at five different storage levels or tiers. 12 indicates a transverse gauge bar, illustrated at one level or tier, the second from the bottom, at the molding end only of the device. Its purpose will later be indicated in detail. It is provided with indicating areas 14.

At each end of the device are generally vertical channels 15 extending upwardly in parallelism with the members 3 and connected thereto as by the transverse upper support 16. These members 15 are shown as provided with trip cams 17. At the molding end these members 17 are located only at the bottom level or tier. At the pouring end they are located only at the four upper levels or tiers. It will be understood, in connection with Figure 3, therefore, that the upper four members 17 are located at one end of the device and that the lowest member 17a is located only at the opposite or molding end of the device.

*The elevator structure.*—There is an elevator at each end of the device, extending entirely across the device. This structure will now be described in detail.

The elevator structure shown for example in Figures 10 to 14 inclusive is indicated generally as 20. It includes a top plate 21 and side angle flanges 22 extending downwardly from the opposite edges of the plate 21. It carries at each end a short track 23 mounted for example on brackets or upward extensions 24. It will be understood that each of the short tracks 23 is aligned with one of the tracks 11 mounted on the heretofore described fixed frame structure. The elevator structure including the members 21 and 22 is supported at its ends as by brackets 25 upon end members 26 shown, for example, as castings. Mounted on each said casting is a drum 27 upon which is dead-ended a cable 28 which passes upwardly about a series of sheaves 29, 30 and thence about a sheave 31 on a cross head 32 and back about similar sheaves 30 and 29 and thence back down to the opposite end of the elevator where it is dead-ended on another drum 27. Keyed to the same shaft 35 is a second drum 36 of greater diameter than the drum 27 but rotating in unison therewith. Dead-ended upon this larger drum 36 is a cable 37 which passes upwardly about sheaves 38 and 39 and thence about a sheave 40 which is pivoted to a counterweight 41 which is guided for vertical movement as by rollers 42 which engage any suitable upright guides 43. The cable 37 is dead-ended as at 44 upon the upper frame structure itself. It will be understood that the elevating structure is substantially identical for both ends of the device and the two ends will not be separately described.

The cross head 32 to which the sheave 31 is pivoted is secured at the end of a piston rod 50 of the molding power cylinder 51. Any suitable means, not herein shown in detail, may be employed for admitting compressed air to the interior of the cylinder 51, in order to cause pressure against the piston 52 and to cause an endwise movement of the piston rod 50. It will be understood that thereby pressure may be applied to either end of the cylinder and thus to either side of the piston 52, whereby the piston rod 50 may be moved in either direction, thus moving the cross head 32 and with it the sheave 31. This cylinder and cross head structure is mounted and guided in any suitable fashion upon the longitudinal upper frame 5. The guiding structure is shown in detail for example in Figure 15 and following, the cross head 32 being provided with end rollers 60 running between upper and lower tracks 61, 62.

It will be understood that the weight of the counterweights 41 is such, that it will permit the empty elevator to descend by gravity, the counterweights are not employed to raise the elevators. Their function will be later described. The elevators are normally raised and lowered by the admission of compressed air to one end or other of the cylinders 51. For convenience the indicating letter "*a*" is applied to the pouring cylinder and its associated parts, whereas the numbers without the indicating letter are applied to the molding cylinder or part.

Assuming that the elevators are down in the position in which they are shown in Figure 1 air will be admitted by the line 58 into the cylinder 51. The result will be to move the piston 52 and with it the rod 50 to the left, referring to the position of the parts in Figure 1. This will move the cross head 32 and the sheave 31 to the left and will draw up on the cable 28 and will therefore lift the elevator at the molding end. The counterweight 41 meanwhile sinks and prevents any rotation of the shaft 35. At the same time the elevator at the molding end is similarly actuated in response to the admission of air through the line 58a, into the cylinder 51a, and the result is that both elevators are simultaneously lifted from their lower position to the upper position. The upper movement of the elevators is terminated for example by the fixed stops 80 and 80a at the upper tier, these stops being so set that when the elevator is stopped the tracks 23 are aligned with the tracks 11 of the upper tier. It will be understood that the introduction of air into the corresponding passages 59 and 59a will reverse this operation and lower the elevators.

The details of the guiding and supporting of the elevator structure upon the frame may be varied but a practical arrangement is shown in the drawings and is described herewith. The side pillars generally indicated as 3 may be formed of a plurality of channels 150. The end elevator castings 26 are each provided with four rollers 151, mounted on any suitable bearings on the castings and are opposed to the opposite inside faces of the two channels 150. Associated with the flanges of the outer channel 150, referring to the lower channel of Figure 5, are side plate members 152. Associated with the inner flange of the inner or upper channel member of Figure 5 is the wider side plate member 153. The rollers 151 prevent the elevator structure from having any lateral transverse movement. A fifth roller 154 mounted upon a bracket 155 on the elevator structure abuts against the lower or outer channel 150 or against its inner side plate 152 and holds the elevator against any movement along the long length of the elevators. In other words, the set of five rollers guide the elevator and constrain it to its vertical shifting movement.

156 indicates a rack mounted on angle plates 157 mounted on one flange of the outer channel 150. It is shown as in mesh with a pinion 158 keyed to a shaft 159 which extends the length of the elevator. It will be understood that this structure is duplicated at each end of the elevator, there being a similar pinion 158 at each end of the shaft 159, each pinion being in mesh with a corresponding rack at opposite sides of the device.

*The tray ejecting device.*—As will be clear from Figure 1, a plurality of trays are employed for supporting the molds, which trays ride on the tracks 11 or 23 as the case may be and which normally fill all five tiers of the device, extending without interruption from end to end of each pair of tracks 11 at each tier. The structure of these trays is shown in some detail for example in Figures 10 and 11. It may include a body 90 of sheet metal, formed with flanges 91 at each end reinforced by longitudinally extending angle members 92 and provided with cross braces 93. At each end of each of the trays 90 are illustrated flanged supporting wheels 94, shown in pairs and mounted on any suitable bearings 95. Any suitable bumpers or buffers 96 may be employed whereby the area of contact between adjacent trays is limited and localized. Extending between two of the intermediate, preferably center braces, is a bar 97 which serves as a contact member for a control structure later to be described.

It will be understood that in the normal employment of the device each tier of tracks is completely filled with trays and one additional tray is located upon one or other of the elevators. The operation of the device necessitates that each line of trays shall be continuous, so that by a push at the end of one line of trays, by the addition of the extra tray, the entire line may be moved by the width of one tray and the end tray may be moved out upon the elevator opposite to the elevator from which the last received tray is expelled.

The mechanism for expelling a tray from one elevator and thus moving a tray out upon another elevator is as follows. When an elevator, in its upward movement, abuts against a stop, for example a fixed stop 80, then the continued pull on the cable 28 obtained from the continuing movement of the piston 52 and the rod 50 and the sheave 31 will cause a rotation of the shaft 35, overcoming the action of the counterweight 41. The rotation of the shaft 35 as shown, for example, at Figure 6 causes rotation of the bevel pinion 100 which is keyed thereto. It in turn meshes with the bevel gear 101, keyed on the shaft 102 on the elevator structure which in turn has keyed to it the lever 103 which has mounted on its outer end the roller 104. This roller 104 abuts against one edge of the tray structure 90 and therefore a rotation of the shaft 35 moves the roller 104 against the edge of the tray structure and thrusts the tray along the tracks 23 and out upon the tracks 11, pushing the entire series of trays before it. The successive positions of the roller 104 in expelling the tray are shown for example in Figure 5.

*The receiving mechanism for receiving the tray when it is expelled upon an elevator.*—As when one elevator is aligned with any one tier, the opposite elevator is always aligned with the same tier, the opposite elevator is there ready to receive the tray at the opposite end of the tier.

To receive the tray without jolting it and to position it upon the opposite elevator the following structure is illustrated. A buffer or limiting arm 110 is formed integral with a carriage structure 111, as shown, for example, in Figure 10. This carriage 111 is provided with four rollers 112 which run in track slots 113 in the upstanding flanges of the angle irons 114 mounted upon the elevator structure. Downwardly extending from the carriage is a forked extension 115 which terminates in a cross head 116 which has secured to it a piston rod 117 terminating in a piston 118 operating in an air cylinder 119. Referring to Figure 10, when the tray is projected upon the elevator it is received by the member 110 which is then situated in the dotted line position. The thrust of the expelling structure upon the opposite carriage thrusts the tray into the full line position in which it is shown in Figure 10 and therefore moves the piston 118 into the position in which it is shown in full line in Figure 10. The air is permitted to pass through the cylinder slowly through the small port 120 and the passage 121. It will be observed that a certain measure of relative movement is permitted between the rod 117 and the piston 118. When it is acting as a shock absorber the end of the rod 117 abuts against the forward cap of the piston 118, so that air can pass only through the vent 120. When the device is moving in the retrograde direction the first effect of the movement of the rod 117 to the right, referring to the parts in the position in which they are shown in Figure 10, is to give it a slight movement in relation to the piston, which is limited by the circumferential flange 121. When it has so moved it then permits air to pass through the additional vents 122 in the cap of the piston, whereby the rearward movement of the piston is permitted at a considerably faster speed. The shock absorber is a closed system and no air is normally received into the cylinder or expelled from it. However, a plug does give access to the interior when necessary and is shown, for example, at 123 in Figure 10.

The shock absorber is returned from the full line to the dotted line position, referring to Figure 10, by rotation of the shaft 35, which is provided with a fork or pair of arms 124. These arms 124 are each provided at the end with a roller 125. These rollers 125 are aligned with and adapted to engage side projections 126 on the downwardly extending portion 115 of the carriage 111. Thus a clockwise rotation of the shaft 35, referring to the position of the parts as shown in Figure 10, will restore the shock absorber to the dotted line position. Of course this return movement of the buffer does not take place until after the tray has been expelled from the elevator and every time a tray is expelled from the elevator the shock absorber for that particular elevator is at the same time restored to its original position.

*The means for holding the trays in vertical alignment with the elevators.*—When as above described, the expulsion of a tray from one elevator thrusts the end tray of the series from one end of a pair of tracks 11 to the opposite elevator the abutting bumpers 96 of the trays are all in contact. The movement of expulsion from the first elevator does not continue far enough finally to position the terminal tray on the opposite elevator. Figure 11 illustrates a mechanism for doing this. The previously described abutment 97 which is positioned in the lower portion of the body of each tray is shown in Figure 11 as engaged by an upstanding lever 130 which is keyed to a shaft 131 mounted in any suitable brackets 132 on the elevator structure. Keyed to the same shaft is another lever 133 which is connected by any suitable link 134 to a crank arm 135 rotatable about and loose on the shaft 35. The link 134 is in Figure 11 shown to be adjustable as to length. The crank arm 135 is associated with a sleeve 136 surrounding the shaft 35 which is provided with another arm 137 which is connected by a coil spring 138 to a bracket 139 on the elevator structure. The effect of the spring 138 is to tend to impart a clockwise rotation to the sleeve 136 and to the arms 135 and 137 and thus to the lever 130, which is kept thereby normally in the dotted line position of Figure 11, at a level below that of the tray. After the tray has passed upon the elevator to the position in which it is shown in Figure 10, the shifter arm or lever 130 is moved from the dotted line to the full line position and, when it engages the stop or abutment 97 it moves the tray forward into its final position upon the elevator. This final movement of the lever 130 results from the continued rotation of the shaft 35, which has keyed thereon a sleeve 140. This sleeve 140 is provided with a lateral extension 141 which engages a corresponding lateral extention 142 from the sleeve 136 and the final rotation of the shaft 35 therefore imparts a counterclockwise rotation to the sleeve 136, referring to the position of the parts in which they are shown in Figure 11, and effects the final positioning of the tray, sufficiently far out on the elevator and on the tracks 23 to permit the elevator to be moved without having the tray contact any part of the supporting structure or any part of the previously abutting tray. This separation between the tray on the elevator and the adjacent tray on the tracks 11 is shown, for example, in Figure 10. The upper surface of the elevator is cut out or slotted as at 143 to permit this movement of the lever 130.

*The stops for controlling the position at which the elevators are stopped.*—The movement of the elevator has for purpose of illustration been described in connection with the fixed stops 80 aligned with the top tier of tracks 11. It will be understood, however, that it is necessary to be able to stop the elevator in alignment with any one of all five tiers and the top structures for obtaining that stopping action are described herewith. We therefore provide a plurality of retractable stops arranged in pairs, there being two pairs for each tier of tracks or trays at each end of the elevator, there being eight stops for each tier. One of said stops is illustrated in detail in Figure 20 it being applied to one or the other of the channels 150. The channel is cut away or apertured as at 160 to center and permit the passage through the member 150 of the inner extension or sleeve 161 of the stop cylinder 162. Slidably guided in the sleeve 161 is a square end stop pin 163, which is provided with a head 164 within the cylinder 162. A spring 165 tends normally to hold the stop pin in the retracted position in which it is shown in full line in Figure 20. The cylinder is closed by the screwthreaded cap 165a which may be pierced by an air line 166 effective to introduce pressure into the space between the cap 165a and the head 164 whereby the spring is compressed and the stop pin 163 may be thrust into locking or dotted line position. These pins or pairs of pins 163 may be moved into the locking position in which they are shown, for example, in Figure 5. When in such position they abut against the abutment or contact member 167 which is mounted upon the end casting of the elevator as shown, for example, in Figure 7. 168 are any suitable cushioning springs and 169 is a guiding and limiting pin with a nut 170 which serves to limit the upward movement of the member 167 in response to the expansion of the springs 168. It will be understood that there is sufficient frictional contact between the pins 163 and the member 167 so that when once the elevator has been lifted into the stop engaging position in which it is shown in Figure 7 the stop pins will remain in locking position until the elevator is lowered sufficiently to relieve the frictional contact and to permit the springs 165 to expand, withdrawing the stop pins.

Referring, for example to Figure 7, a similar structure is also mounted upon the bottom of the elevator casting, the corresponding members 167a coming to rest upon fixed stops 171.

*The means for holding the trays on the tiers or tracks to prevent their undesired movement into vertical alignment with the elevators.*—The tracks 11 are preferably substantially horizontal so that there is a minimum tendency of the trays to roll therealong in response to gravity. However, in order to prevent any unintended movement of any of the trays into vertical alignment with the elevators we provide the following structure.

Figure 21:
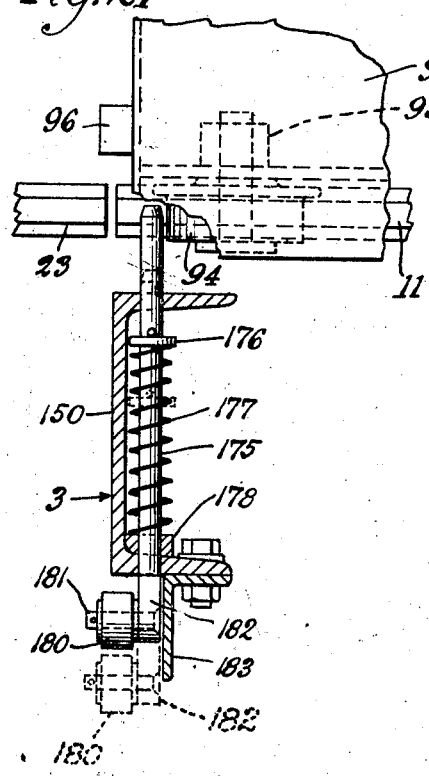
Figure 21 is a section on the line 21—21 of Figure 7.

Referring, for example to Figures 5, 6 and 21, 175 indicates a horizontally located locking pin passing through both flanges of one of the channels 150. It is provided with an abutment ring 176. Between this abutment ring 176 and the outer flange of the channel 150 is a spring 177 the outer end of which abuts against an abutment block 178 secured to the inner face of the outer flange of the channel 150. This spring tends normally to urge the locking pin 175 into the locking position in which it is shown in Figure 21 with the end of the pin extending across the upper face of one of the tracks 11, adjacent its end. It will be understood that at each tier there are four of these locking pins 175, one for each end of each track 11. It will be understood that the ends of the locking pins are in the path of the rollers or wheels which support the trays, as is shown in Figure 21.

In order to retract the locking pins 175 and to permit movement of the trays along the tracks 11 we provide a cam 179, shown, for example, in Figure 6, mounted on the upper portion of the end castings of the elevators which engages a roller 180 mounted upon a pin 181 at the outer end of the bolt 175. The end of the bolt 175 may be somewhat broadened or widened as at 182 shown, for example, in Figure 6 and abutting against an angle 183 in order to prevent rotation of the pin 175 and thereby to keep the roller 180 in proper position to engage the cam 179. It will thus be seen that when the elevator is aligned with any particular tier the cams 179, there being one at each end of each elevator, move the particular locking pins for that tier into unlocking position, to permit the wheel supported trays to be moved on to or off of the elevators.

*Means for preventing undesired rotation of the shaft which controls the means for expelling the trays from the carriages.*—When one of the elevators is in receiving position in alignment with one of the tiers of tracks 11 it is desirable to prevent the actuation of the expelling mechanism, and to permit the wheel tray to be received upon the elevator. Therefore, referring, for example, to Figure 5, means are provided for holding the roller 104 in the retracted position at which it is shown at A or D, to permit the tray to reach the proper position on the elevator. A ready means for locking the shaft 35 against rotation, and thus for holding the roller 104 in retracted position is shown, for example, in Figures 5, 6 and 8. The drum 36 which is keyed to the shaft 35 is provided with an arcuate slot 190, concentric with the axis of rotation of the drum. Mounted upon the end casting 26 of the elevator is a sleeve 191 in which is slidably mounted a pin 192 the outer end of which is provided with a roller 193. 194 is a species of cross head bearing against the guides 195 shown in Figure 5. It also serves as a spring abutment for the spring 196 which tends normally to urge the pin 192 into unlocked position. The pin is aligned with the slot 190 and, when the roller 193 runs over one of the cams 17 or 17a shown, for example in Figures 3 and 6, the inner end of the pin 192 is thrust into the slot 190. It thus locks the drum and the shaft 35 against rotation except within a limit defined by the length of the slot 190. Referring to Figure 5, this permits a movement of the roller 104 between the positions A and D. Thus as long as the roller 193 is aligned with the cam 17 or 17a the shaft 35 can rotate only through an angle equal to the angle defined by the slot 190 in relation to the axis of rotation of the drum and of the shaft 35.

This locking structure is identical for each end of each elevator. However, locking abutments or cams 17a are shown only for the lower tier of the molding elevator and cams 17 are shown only for the four upper tiers of the pouring elevator. This is because in the normal use of the device the molding elevator receives only on the lower level. This movement of the trays in relation to the two elevators is diagrammatically illustrated in Figures 28 and 29, the arrows indicating the direction of normal movement of the trays to the respective elevators. For the purpose of the diagram X indicates the pouring elevator and Y the molding elevator.

*The mold weights.*—In the operation of the device, it will be understood that the molds are formed and placed upon the molding elevator, are distributed by the molding elevator to the various tiers of the storage tracks, are received from these storage tracks by the pouring elevator, and are poured when upon the pouring elevator and are delivered from the pouring elevator to the lowest tier of tracks, this being the movement diagrammatically illustrated in Figures 28 and 29. Before the molds are poured it is desirable to place a weight upon each mold and to hold this weight upon the mold for a predetermined short period after the pouring. However, immediately after the pouring, the mold and its tray is discharged from the elevator and means are therefore provided for permitting the weight to travel a certain distance with the tray and upon the mold. This structure is shown, for example, in Figures 1 and 22 to 25 inclusive. In Figure 1 a mold generally indicated as 200 is illustrated as resting upon the top of one of the trays 90. It will be understood that in Figure 1 the particular mold which is on the elevator has been poured and the weight positioned on it. A plurality of weights 201 are employed each such weight being shown as including a body portion 202 and forwardly extending fingers or bars 203 connected by a cross piece 204. Webs 205 extend upwardly from the portion 202 of the plate and have pivoted to them the arms 206 and 207 respectively, the pivoting being independent and at opposite ends of the webs. The arm 206 is secured to a shaft 208 about which it is allowed a limited rotation by the key 209 and the slot 210. The shaft 208 is mounted in a series of bearings 211 in any suitable brackets 211a. The keys 209 extend the length of the shaft 208 except for interruptions in line with the bearing so that the shaft 208 can freely rotate in its bearings 211.

The links 207 are mounted upon a shaft 212 which extends through bearings 213 which may be formed in the same brackets 211a. It will be observed, for example from Figure 25, that the length of the arms 206, 207 and the location of their various pivotal connections is such that the weights 202 are always in horizontal position and may be raised several inches above the lower level in which they are shown in Figures 22 and 25.

The shafts 208, 212 and their supporting brackets are mounted upon a carriage structure generally indicated as 215. This carriage is provided at each end with two rollers 216, which rollers ride in tracks 217 at the opposite sides of the device. These tracks are located in the main frame of the device just below the second tier of tracks 11 so that the weights 202 are in proper position to rest upon the tops of the molds riding along the lower tracks 11.

It is necessary to raise the weights from the lowered position in which they are shown in Figures 1 and 25, to the full line position in which they are shown in Figure 22. The dotted line position of Figure 22 shows the position of the weights after they have been dropped upon the mold upon the pouring elevator when the mold is aligned with the bottom tier of tracks 11. The carriage 215 moves back and forth the length of one step of the movement of the molds. In Figure 22 the carriage is shown in dotted line position at the limit of its movement toward the pouring elevator and in full line position is shown at the limit of its movement away from the pouring elevator. Assume that the carriage 215 is in the dotted line position of Figure 22 with the weights in the raised position in which it is shown in full line in Figure 22. The weights are lowered into the dotted line position of Figure 22, upon the top of the mold by actuation of the following mechanism. A cylinder 220 is pivoted as at 221 to the weight carriage. Slidable within the cylinder is a piston 222 controlling the piston rod 223. Pivoted to the outer end of the piston rod 223 is an arm 224 downwardly extending from the shaft 208. 225 is any suitable power line whereby compressed air or the like may be admitted to or released from the cylinder 220, whereby the rod 223 may be advanced from or retracted into the cylinder. This structure is shown in lifted position in full line in Figure 22. In the same figure it is shown in lowered position in dotted line. It will be understood that in the use of the device the weight rests upon the mold until the mold has advanced one step into what we may call the storage area upon the lower tier of tracks 11. After the mold has reached this storage position pressure is again applied to the cylinder 220, whereby the piston rod 223 is expelled and the weights are lifted. Then the carriage is moved in reverse direction until the weights are again aligned with the tray upon the elevator and the molds carried thereby.

It will be understood that whereas friction with the sand of the mold may be sufficient to move the weights and their supporting carriage into the storage zone, when a tray is expelled into the storage zone from the pouring elevator, positive means are preferably employed for returning the carriage in the direction of the elevator after the weights have been lifted from the mold. Any suitable means may be employed for this purpose but I illustrate for example a compressed air cylinder 230 with its piston rod 231 and its pressure line 232. The rod 231 may be pivoted as at 233 to the carriage 215. The carriage 215 is moved back toward the pouring elevator by the admission of pressure through the line 232. At the end of its excursion toward the pouring elevator the cam 234 on the carriage 215 may contact the contact member 235 which actuates the switch generally indicated as L4. This, in connection with the general circuit structure elsewhere herein described, causes a reduction of the pressure in the cylinder 220 which permits or causes the weights to be dropped into the depressed position in which they are shown in dotted line at the left end of Figure 22.

This weight shifting mechanism is an important part of the structure, because it does away with the use of a man, and avoids delay, in placing the weights on the molds when they are ready to be poured, and removing them before the molds are shaken out. The essential characteristic is that automatically, and without any intervention of the operator, the weights are placed on the molds when the molds drop to alignment with the lower track 11 and the weights travel on and with the molds for a short distance, and then are automatically lifted from the molds. Placing these weights by hand is a difficult and troublesome and delaying matter and is entirely avoided by the illustrated structure. In pouring molds, the weights are automatically lowered on to the molds, ready for pouring, and after sufficient time has elapsed after the pouring operation for the metal to cool slightly, the weights are automatically raised, and the poured mold is transferred to a storage tier until the metal is thoroughly cooled, when the mold is again returned to the shake-out point.

When it is desired to shake out the mold, the attendant removes the follow board and bands from the tray on which the mold rides, dumps out the sand and the casting, replaces the follow board on the tray, and places the bands on the top of the follow board in the same position they occupied before the shake-out operation. After all the flasks on a given tray are shaken out, the bands and follow boards are then transferred along the storage tier track to the opposite end of the storage structure to the molder, who makes up a new mold. This arrangement automatically provides follow boards and bands in the right position and number, for the molder or molders.

This method and apparatus are well adapted for intermittent pouring but we do not wish to be limited, in the employment of our invention, to an intermittent pouring circuit.

*The control system for controlling the actuation of the device.*—The main mechanical parts of the device have been above described in considerable detail. The cycle of operations is carried on in part automatically and in part under manual control. It will be well to outline briefly the sequence of acts or operations before describing in detail the system of controls whereby the method herein described may be carried out.

Figure 28 is a diagrammatic indication of the movement of the molds during the molding operation and during the storing and removal of the completed molds. The same cycle will apply to both the formation and the removal of the poured molds. Figure 29 is a diagrammatic illustration of the movement of the molds during the pouring operation. In these figures X indicates the pouring elevator and Y the molding elevator. When an operator begins to form molds the molding elevator Y is placed at a convenient height from the floor, as shown in Figure 28. This height may, for example, be 22 inches, which has been found convenient in practice. The operator, from any suitable source, receives his molding sand, patterns and the like, fills his flask and cup with sand, takes his impression of the pattern and does whatever is necessary in order to form a mold which is ready to pour. The mold or molds are placed upon the elevator Y and may be aligned for example by the gauge bar 12. The gate or metal inlet of each mold may be aligned with one of the indicating marks 14 which will insure its coming between the openings of the mold weights between the bars 203 as shown, for example, in Figure 23, so that when the pouring operation takes place the molds can readily receive the molten metal. After the operator has filled the elevator with molds he actuates the controlling machinery and both elevators rise to the top tier of tracks 11. When they reach that tier the shaft 35 of the molding elevator is rotated, as earlier herein described and the tray expelling mechanism is actuated, the rollers 104 at each end of the molding elevator thrusting the tray and the molds with it from the elevator and upon the tracks 11 of the upper tier. When this takes place the pouring elevator is also positioned in line with the upper tier of tracks and the entire upper tier of trays is moved forward in the direction of the pouring elevator. Let it be assumed that they are all empty. After the tray has been expelled from the molding elevator and has been received by the pouring elevator, both elevators then drop to the lower level and at the lower tier the tray just received by the pouring elevator is expelled from that elevator upon the lower track 11 and the last tray upon the lower track 11 is thrust upon the mold elevator. The mold elevator then rises to the receiving position and at the same time the pouring elevator rises; however, the pouring elevator is permitted to descend to its lowest level. The operator then places his mold or molds upon the elevator and again actuates the device in such fashion that both elevators rise to the top tier or to whatever other tier the operator wishes and the circulation continues, with the operator continually receiving new trays on the molding elevator, placing and forming molds on the tray, and expelling the molds from the elevator until, if the operator wishes, all tiers of track at all levels are filled with trays having on them completed molds ready to be poured.

In the particular embodiment of the invention herein shown this operation is to a degree automatic. That is to say, when the elevators rise to the uppermost position the abutment of the elevators against the fixed stops 80 immediately causes the operation of the expelling machinery on the molding elevator and of the receiving machinery on the pouring elevator, whereby the entire upper tier of trays moves to the left, referring to the parts in the position in which they are shown in Figure 1. Then both elevators immediately thereafter automatically drop to the lower level and automatically the tray is expelled from the pouring elevator and a new tray is received by the molding elevator. It will be understood that while the shifting is being done both elevators are held upwardly against the controlling stops at the particular level at which they may be, for example, by the air in the cylinders 51 and 51a. As this last movement is taking place the elevators automatically settle down or drop in such fashion as to clear the contact between the elevators and the stops 163. In response to this last lowest drop of the two elevators switches are contacted which cause them automatically to begin their upward excursion. The molding elevator is automatically stopped at the molding level above mentioned, say at 22 inches above the floor. At the same time the pouring elevator, during the molding cycle, will rise all the way to the top of its elevator shaft and will then settle back to the floor level. During its solitary rise, and during the time at which the molding elevator is in the molding position at the 22 inch level the pouring elevator, being alone when it passes the upper levels does not stop at the upper levels and neither the discharging nor the receiving mechanism of the pouring level is actuated. After the molding is finished and the operator is ready again to receive a new tray he presses his control button below described and the cycle again begins until it is terminated again by the stopping of the molding elevator at the molding position with a fresh tray to receive its ensuing load of molds.

During the pouring cycle the control which causes the molding elevator to stop at the molding level of 22 inches is cut out and that stop no longer takes place. The pouring takes place on the pouring elevator at the floor or lower tier level. Otherwise the action is the same. After each mold is poured the tray which carries it moves to the right, referring to the position of the parts in Figure 1. Both elevators rise to the top of their respective shafts. At the uppermost position the molding elevator discharges its load and the pouring elevator receives a new tray supporting empty molds ready to be poured. Then it stops automatically at the pouring or ground level and the operation is interrupted until the operator, after having poured the molds on that tray, again actuates the system by pressing a button or throwing a switch.

Whereas both sequences or cycles have been described in terms of causing the elevators to rise to the uppermost level, it will be understood that the supplemental stops indicated as 163a may be actuated, under the control of the operator, by any suitable switching or control mechanism, whereby the cycle may be made to include with the bottom level any one or other of the upper levels.

In order to maintain or carry on this partially automatic and partially manually controlled molding and pouring cycle, a rather comprehensive system of circuits and controls has been employed.

A plurality of electric snap switches and limit switches are located about the elevator and frame structure. Referring to the diagrammatic illustrations of Figures 14 and 9, which show the pouring elevator X, a snap action, double throw limit switch W is secured beneath said elevator structure in alignment with the rotatable shaft 35 to which is keyed a hub 250 carrying two arms 251 and 252. The arms are provided with adjustable contact members 251a and 252a, adapted to engage the roller 253 and actuate the switch arm of the switch W. The function of the limit switch W is to operate the hoisting and lowering of the elevators, more particularly brought out below in the description of the wiring diagram.

Figure 14:
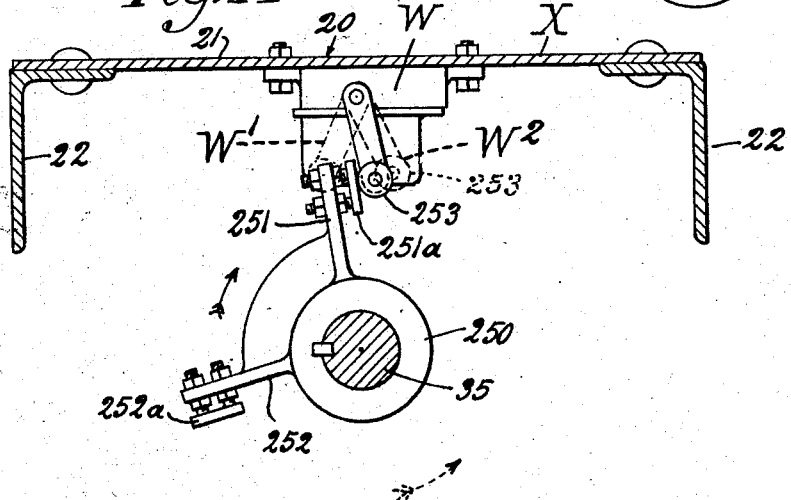
Figure 14 is a section on the line 14—14 of Figure 9.

The parts illustrated in Figure 14 are shown in their relative positions when the levers 103 of the pouring elevator X are about to discharge a tray, the shaft 35 having approximately completed its rotation in the direction of the arrow. The means for actuating the shaft 35 have been clearly pointed out and described above. The switch arm and roller 253, normally held in the dotted line position indicated by W1, has been rotated past the axis of its pivot, and is permitted to snap into the dotted line position indicated by W2. The function of the switch W just described results in the breaking of one set of contactors, diagrammatically indicated in the wiring diagram of Figure 26 and indicated by like symbols and making contact with another set of contactors. The actuating arm of the switch W, when in the position indicated by W1, is in electrical contact for hoisting the elevators, whereas, when rotated in the dotted line position W2, it makes electrical contact for lowering the elevators. On the reverse rotation of the shaft 35, illustrated by the arrow in dotted lines, the contact member 252a on the arm 252, engages the roller 253 and rotates the switch arm clockwise, back to the dotted line position W1.

Figure 9:
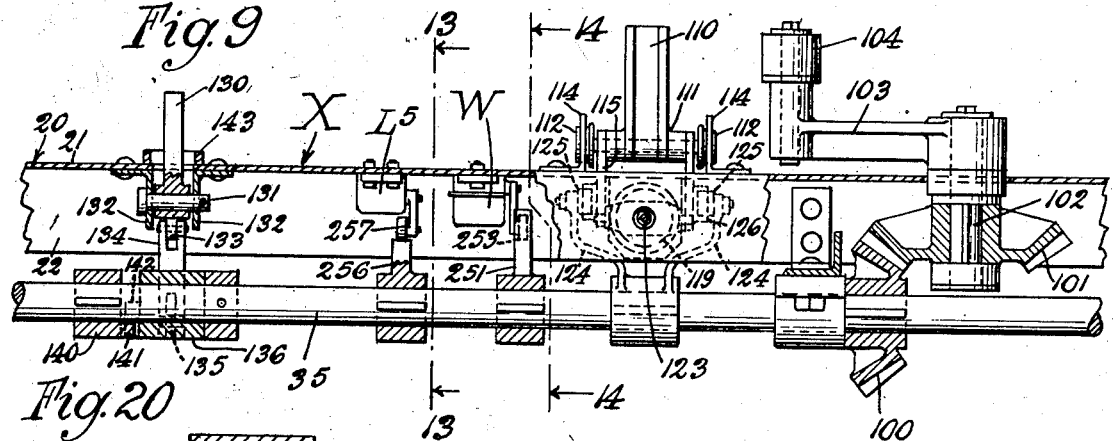
Figure 9 is a detail similar in location to Figure 6, showing the elevator of the pouring end.
Figure 13:
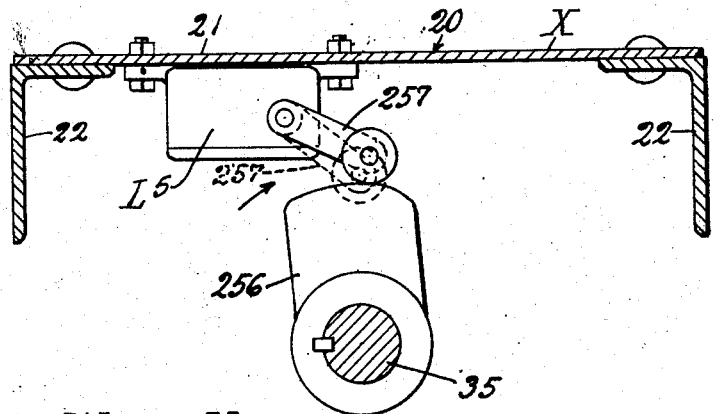
Figure 13 is a section on the line 13—13 of Figure 9.

Mounted on the pouring elevator X, as shown in Figures 9 and 13, is a limit switch L5, adapted to automatically control the stop pins 163 and a lock pin 255, the purpose of which will later appear. Keyed to the shaft 35 is a cam or lever 256 for rotating the switch lever 257, from the dotted line position, shown in Figure 13, to the full line position.

In the position of the parts as illustrated, they are approximately near the completion of the rotation of the shaft 35 in the direction of the arrow, that is to say, when a tray has about been pushed off the pouring elevator structure by the levers 103, with the position of the roller 104 on the lever 163, as illustrated in Figure 5, indicated by the letter B. When the switch arm 257 is in the full line position of Figure 13, an electrical connection is broken which results in withdrawal of the stop pins 163 and 255. The position of the roller 104 of the lever 103 is approximately at C at commencement of withdrawal of the stop pins with the lever rotating clockwise for discharging a tray. The switch lever 257 of the limit switch L5 returns to the dotted line position as soon as the cam 256 has rotated counterclockwise sufficiently to clear the path of the switch lever roller.

Note that the positions B and C of the roller 104, shown in Figure 5, are merely illustrating the location of a corresponding roller on a lever 103 on the pouring elevator X.

Figure 12:
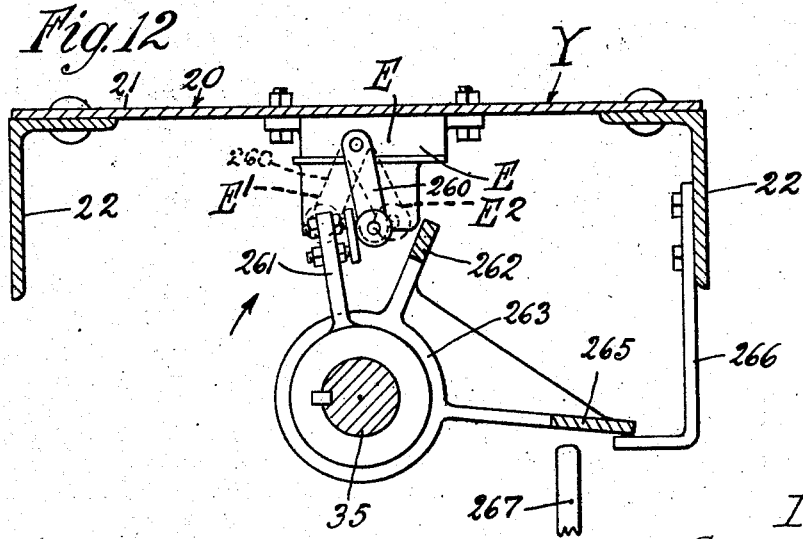
Figure 12 is a section on the line 12—12 of Figure 6.

Referring to Figures 6 and 12, a double throw snap action electrical switch E is secured beneath the top plate 21 of the molding elevator Y, for purpose similar to the switch W, for reversing movement of the elevators. The switch arm 260 of the switch E may be rotated counter-clockwise, as illustrated in Figure 12 by a lever 261 keyed to the shaft 35. The lever 261 is shown at the completion of rotation of the shaft 35 in the direction of the arrow, and having rotated counter-clockwise, the switch arm 260 from the dotted line position, indicated by the letter E1 to the full line position, ready to snap into the dotted line position E2. Rotation of the shaft 35 of the molding elevator occurs only after the elevator has been raised and reached its selected tier. The switch lever in the dotted line position E2 closes electrical contactors for lowering of the elevators. At this point, the levers 103 have discharged a tray and the shaft 35 and the arm 261 are rotated counter-clockwise by means previously described. The shaft 35 is rotated approximately 246½°.

The switch lever 260 remains in the position E2 until the molding elevator Y reaches its lowermost level, when a second arm 262 on a forked bearing 263, straddling the lever 261, comes into play. The bearing 263 is mounted to rotate freely upon the shaft and is held in the position illustrated by means of a companion arm 265 resting upon an angular member 266, secured to one of the members 22 of the elevator. A predetermined distance before the molding elevator has reached its lowermost position, the companion arm 265 engages an abutment 267 mounted in the molding elevator pit 2 and rotates the arm 262 counterclockwise and rotates the switch lever 260 from the position E2 to its normal position E1, thus closing an electrical connection for hoisting the elevators. The arms 262 and 265 are so proportioned as to overbalance the structure shown and to return it to its initial position, as shown, as soon as the molding elevator Y is raised. It is evident from the above description that when the molding elevator is at its lowest level, the switch lever 260 of the reversing switch is in the position E1 for lifting the elevators, whereas, when the molding elevator Y is at its selected tier and has discharged a tray of molds, the switch lever 260 is in the position indicated by E2 for lowering of the elevators.

Mounted upon the frame members 5 are a plurality of single contact spring operated limit switches, the purpose of which will be later described. Adjacent and in alignment with the piston rod 50 for actuating the molding elevator Y is a switch L7, normally held in open position as illustrated in the wiring diagram of Figure 26, and in detail in Figures 15 and 16, a switch L10, normally held open and a switch L9 normally held closed.

The switches above described are actuated by camming levers 270 and 271, hinged upon the cross head 32. The levers 270 and 271, are mounted so as to contact and to actuate their co-operating switches, only when the cross head moves in one direction; the levers engage the rollers of the actuating levers on their respective switches. When the cross head 32 moves in reverse direction, the levers are rotated by said rollers and the switches remain inoperative. For example, the switch L7 is actuated and closed by the cam lever 271 when the cross head 32 lowers the molding elevator Y, whereas the switches L9 and L10 are actuated by the cam lever or levers 270 while hoisting the molding elevator.

Figures 17, 18 and 26 illustrate single contact switches actuated by the cross head 32a for raising and lowering the pouring elevator X. Suitably secured to the frame member 5 adjacent the piston rod 50a is a switch L8, normally held closed, a switch L3, normally held open, and a switch L6, normally held closed. Hinged cam levers 273, 274 actuate the levers of their associated switches only when the cross head 32a lowers the pouring elevators.

The switches L3, L8, L6 and switches L7, L9 and L10 are effective only while being actually actuated and engaged by their respective cam levers 270, 271, 273 and 274, either to make or break their electrical connections, later to be described.

Referring now to Figures 2, 3, 4, 7 and 26, each molding elevator Y and pouring elevator X carries limit or interrupting switches, the purpose of which will later appear. The molding elevator carries an interrupting switch L2, shown in Figure 3, and the pouring elevator carries a similar switch L1, not shown in detail, but diagrammatically indicated adjacent the switch W in Figure 26. Both interrupting switches are located at the left hand side, referring to Figure 3.

Figure 2:
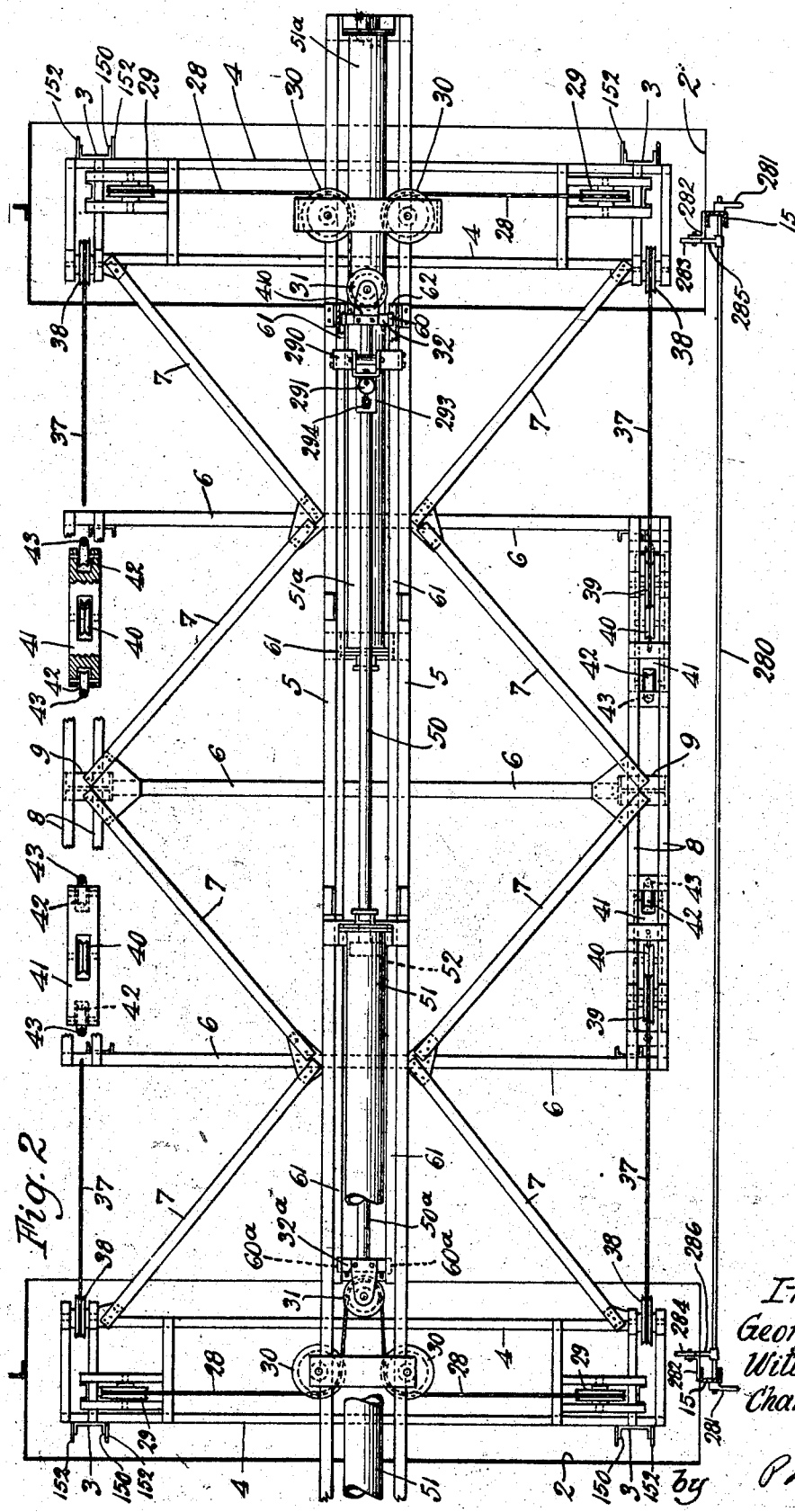
Figure 2 is a top plan view with tracks, trays and elevators omitted.

A suitable means for actuating the limit or interrupting switches L2, L1 is shown in detail in Figures 2 and 4. Rotatably mounted upon the channels 15, a predetermined distance below each tier, except the lowermost tier, are shafts 280, provided at their extreme ends with manually actuating levers 281. Pivoted to suitable brackets 282 are latch cams 283 and 284 which may be rotated in the direction of the arrow from the dotted line position of Figure 4 to the full line position by means of co-acting levers 285 and 286, respectively, upon the shafts 280.

A stop pin 287 upon each bracket 282 limits rotation of the latch cams in either direction. The arcuate portion 283a of the latch cams 283 are in alignment of the path of travel of the interrupting switch L2 whereas similar arcuate portions of the latch cams 284 are in alignment with the switch L1 on the pouring elevator. In the dotted line position of Figure 4, the latch cams 283 and 284 are effective and contact the rollers on the levers of their respective interrupting switches L2, L1. Note, that the latch cams for the uppermost tier may be fixed as indicated in Figure 3, whereas the remaining latches are selectively manually rotated into operative or inoperative positions. The latch cams are overbalanced to return to operative position.

Means for holding the molding elevator at a predetermined height from the floor level are diagrammatically indicated in Figures 1 and 2. Mounted upon a bracket 290 on the track members 61 is the housing 291 for the stop pin 255.

Figure 20:
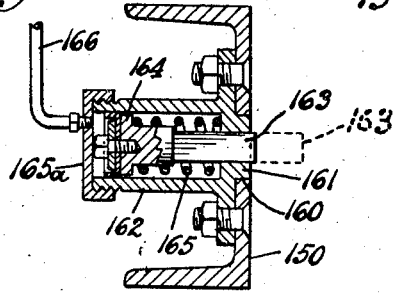
Figure 20 is a section of one of the elevator lock bolts, taken on the line 20—20 of Figure 7.
Figure 19:
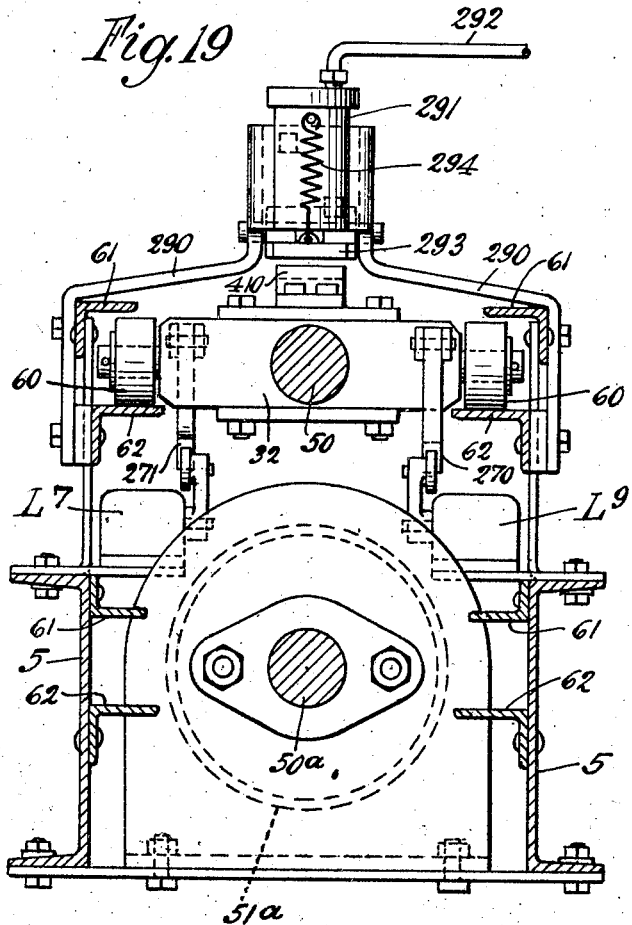
Figure 19 is a section on the line 19—19 of Figures 1 and 15.

The detail construction is identical as illustrated in Figure 20, air or fluid for projecting the stop pin 255 being admitted by means of a duct 292. In alignment with said pin is a latch arm 293, one end of which is pivoted to the bracket 290. It is normally held in inoperative position, as shown in Figure 1, by a spring 294. The purpose of the latch arm is to engage an abutment 410, mounted upon the cross head 32 which actuates the molding elevator, to retain said elevator at the molding level. The electric switch L10 controls the admittance of air under pressure into the housing 291 to project the stop pin 255, which in turn rotates the latch about its pivot counter-clockwise, referring to Figure 1, to be engaged by the abutment 410, on the cross head 32, and thus lock and hold the molding elevator at the predetermined height for molding.

Figures 26 and 27 illustrate diagrammatically pneumatic means for actuating the piston rods 50 and 50a, the mold weights and the stop pins 163 and 255, and further show electrical control means and wiring for said pneumatic means. The air valves and electrical control apparatus may be mounted upon suitable panels and framework, not shown, and may be located at any convenient place, preferably intermediate the elevators.

300 is the main air duct connected to any suitable air supply under pressure. Interposed in the air duct may be a settling tank 301, and an air filter 302. Leading from the main air duct are branch connections 303 leading to intake ports of air pilot valves 305, 306, 307, 308 and 309. The air pilot valves are identical, each being provided with a double acting valve of the plunger type, which are controlled by the solenoids 305a, 306a, 307a, 308a and 309a. Each valve chamber is divided into three compartments, the lowest of which is in communication with the main air supply, an intermediate one conveys the air to ducts leading to the various apparatus to be actuated and an upper chamber serves to exhaust the air from the intermediate chamber. Normally, the double acting valve closes communication between the main air chamber and the intermediate chamber which in turn is open with the exhaust. Energizing of the solenoid actuates the valve to open communication between the lower main air chamber and the intermediate chamber and closes the exhaust. As will be seen, when the solenoid is energized, compressed air is admitted to the intermediate chamber, and when the solenoid is de-energized, the air supply is cut off and the intermediate chamber is open to the exhaust. The intermediate chambers of the solenoid pilot valves are connected to the ducts 310, 311, 312, 314 and 315, respectively. The duct 310 is in communication with the air lines 166 leading to the stop pin chambers 162, which, as previously described, are located in close proximity to the lowermost tier. A branch duct 292 leads from the air duct 310 to the stop pin chamber 291.

The duct 311 of the solenoid pilot valve 306 leads to a relay valve 317. The duct 312 communicates with a relay valve 318, having interposed in the duct a check valve 319 and a time delay reservoir 320. The duct 314 is connected with a relay valve 321. The duct 314 is also provided with a check valve 322 and a time delay reservoir 323. The check valves 319 and 322 are of standard construction, with the addition of having their respective checks penetrated by a small aperture, which may, for example, be a hole 1/16th of an inch in diameter.

As will be seen, the flow of air from the solenoid pilot valves 307, 308 is restricted leading to the relay valves 318 and 321, and free to flow in opposite direction. The relay valves 317, 318 and 321 are of the commercial air break relay type, the air from the ducts 311, 312 and 314 actuating a valve mechanism for controlling the flow of air under pressure from branch lines 324 connected with the main air duct 300. The function of the relay valves is identical with that of the solenoid pilot valves above described. Each relay valve is provided with an exhaust port 325. The air relay valve 321 communicates with the air line 58 of the molding power-cylinder 51, the air relay valve 318 is connected to the air line 58a of the cylinder 51a and the air relay valve 317 is in communication by means of a duct 326 with the air lines 59 and 59a of the power-cylinders 51 and 51a, respectively. The air relay valves function to admit air from the main air duct to the cylinders, or to exhaust the admitted air therefrom. The flow of air from the ducts 311, 312 and 314 actuates the valves only, that is to say, when air under pressure is induced into the ducts 311, 312 and 314, the relay valves connect the main air duct 300 with the air lines leading to the cylinders, whereas, when the air pressure in the ducts 311, 312, 314 is relieved, the exhaust ports 325 are in communication with the air lines 58, 58a and 326, respectively.

The duct 315 of the solenoid pilot valve 309 communicates with the air line 225 of the mold weight cylinder 220 and further with the air line 232 of the cylinder 230. Interposed in the duct 232 is a time delay reservoir 330 with a restricted inlet port 331. As will be seen from the above description, the solenoid pilot valve 309 controls the intake and exhaust of air into the cylinders for actuating the mold weights and its carriage 215.

The time delay reservoirs 320, 323 and 330 serve to delay the functioning of the air relay valves 321, 325, and mold weight carriage, respectively.

Referring to the electrical devices for actuating the solenoid pilot valves, a plurality of electro-magnets 335, 336, 337 and 338 serve to close their associated multiple switches, 340, 341, 342 and 343, respectively. The switches are in closed relationship with their co-operating contacts only as long as the electro-magnets are energized, and are in open position normally.

345 is a selector switch panel upon which are mounted a selector switch 346 for the molding cycle of the device and a selector switch 347 for the pouring cycle. The selector switch 346 comprises the switch blades 348, 349 and 350; the selector switch 347 includes the switch blades 351, 352 and 353.

Preferably located near the molder's end of the machine is a starting button 355 and a stop button or switch 356.

Located at the pouring end of the device are the corresponding start button 357 and stop button 358.

A plurality of switches 360, 361, 362 and 363, of the push button type as herein illustrated, and a main power line double contact knife switch 364 may be conveniently located about the machine. The switches 363 and 360 are normally in closed position, whereas the switches 361 and 362 serve to be manually closed with their co-operating electrical contacts.

The molding cycle and the electrical circuits for automatically controlling the various mechanisms are as follows:

Assuming that the molding elevator Y is at the "molder's level", for example 22 inches above the floor level, and the pouring elevator is at its lowest level, as diagrammatically indicated in Fig. 28 and the molder has loaded the tray upon the molding elevator with the finished molds, the operator throws the multiple selector switch 346 in contact with its opposed electric contactors, which control the molding cycle, and pushes the push button 355 located at the molder's end of the machine. An electrical circuit is thus completed from the main electrical power line 370 which, for convenience, is indicated as the positive line, through the line 372, and stop switches 356 and 358, which are interposed in said line 372, thence through the relay magnet 335, the line 373, the starting push button 355, line 374, the switch blade 348 of the selector switch 346, through the line 375, limit switch L8 and the line 376, to the negative main power line 371. The electro-magnet 335, thus energized, closes its co-operating multiple switch 340. The lower switch member of said switch 340 is shunted by means of the line 377 across the wires 373 and 374 and the circuit remains closed regardless of the start button 355. A further circuit is made by the relay switch 340 from the positive power line 370, through the line 372, and stop buttons 356 and 358, to the electro-magnet or relay coil 337, thence through the line 378, the middle switch blade of the relay switch 340, the line 379, the switch member 350 of the selector switch 346, the line 380, leading to the upper switch blade of the relay switch 340, which is connected to the negative power line 371.

The relay coil 337, thus energized, closes the multiple relay switch 342 and establishes circuits for energizing the solenoids 307a and 308a as follows: The solenoid 307a of the pneumatic pilot valve 307 receives electric current from the main positive power line 370 through the upper switch blade of the relay switch 342, the line 381, to the solenoid 307, thence completion of the circuit is through the line 382, limit switch L1, line 383, switch contactor W1 of the double throw switch W on the pouring elevator, the line 384, the switch member E1 of the double throw switch E on the molding elevator, the line 385, middle switch member of the relay switch 342 to the negative power line 371.

The circuit for energizing the solenoid 308a of the pneumatic pilot valve 308 is from the positive power line 370, through the upper switch blade of relay switch 342, and line 381 to the solenoid 308a, thence the circuit is completed through the line 387, the limit switch L2, the lines 388 and 383, the switch members W1 of the double throw switch W on the pouring elevator, the line 384, the switch member E1 of the double throw snap switch E on the molding elevator, the line 385 and middle switch blade of the relay switch 342 to the negative power line 371.

Note, there is also a shunt connection from the relay magnet 337 through the lower switch blade of the relay switch 342, the line 390, the contact member 349 of the selectors switch 346, the line 380, the shunt line 391, which leads to the limit switch L9, the use of which will be later described, and the line 392, which, by means of the line 376 communicates with the negative power line 371.

The above described circuits energize the solenoids 307a and 308a, which actuate the control valves in the pilot valves 307 and 308 and air under pressure is admitted from the main air duct 300 and ducts 303 into the ducts 312 and 314 leading to the pneumatic relay valves 321 and 325. The pneumatic relay valves are thus actuated to admit air or fluid under pressure from the air duct 300 and ducts 324 through the air lines 58 and 58a into the molding and pouring cylinders 51 and 51a, respectively.

A gradual valve opening of the relay valves 318 and 321 is desirable, as will be later described and is accomplished by means of the restricted openings in the check valves 319 and 322 and by the use of time delay reservoirs 320 and 323. The air admitted into the hoisting ends of the cylinders causes both elevators to be raised. However, the pouring elevator, which is without a load will get to its selected tier before the molding elevator. Assuming that the elevators are intercepted at tier #5, the pouring elevator reaches its destination first.

The single pole limit switch L1 on the pouring elevator engages the cam portion 283a of the latch member 284 a predetermined distance from the intercepting points or stops 80 and opens the electric circuit through the solenoid 307a and the air in the ducts 312 is permitted to escape through the exhaust port in the pilot valve 307. In the meantime, the air in the cylinder 51a expands and carries the pouring elevator X past the latch member 283 and the elevator comes to rest against the intercepting fixed stops 80.

The limit switch L1, having cleared the latch 283, closes again and energizes the solenoid of the pilot valve 307. Air under pressure is again relayed through the duct 312 and through the restricted opening in the check valve 319 into the time reservoir 320 and thence into the relay valve. The time required by restricting the air in this manner and allowing it to expand in the reservoir is very desirable, as it results in a gradual opening of the relay valve 318. The relay valve becomes effective about the time when the spring thrust contact bars 167 of the end members 26 of the pouring elevator X are within close proximity to the fixed stops 80, for example, within one inch, and a gradual opening of said relay valves prevent a sudden jolt of the elevator when the contact bars 167 engage the stops and are further raised until the rails 23 on the elevator are in alignment with the rails 11 of the uppermost tier. At this point the bumper bars 167 are seated upon the spring retainers of the springs 168.

At the same time, the rollers 193 of the lock pins 192 are in engagement with the cam 17 adjacent tier #5 and are thrust into the slots 190 of the drums 36 permitting only a relatively limited rotation of the shaft 35 and movement of the shifter arm 103, previously described.

The cams 179 have also become effective by withdrawing the lock pins 175 out of the path of the tray wheels 94 of the trays 90 upon the upper tier.

After the pouring elevator is securely locked against the stop 80 on the pouring end with the roller of the shifter arm 103 in a position indicated by D in Fig. 5, the pressure in the molding cylinder 51 has built up sufficiently to force the piston rod 50 inwardly and raises the loaded molding elevator Y. As the molding elevator ascends, the lever 270 engages and opens the limit switch L9, which, however, is rendered ineffective by the shunt connection of the upper switch blade of the relay switch 340 with the negative power line 371 and the relay magnet 337 remains energized.

The molding elevator continues its excursion upwardly, until the limit switch L2 on the elevator Y is engaged by the latch 283 adjacent the uppermost tier and de-energizes the solenoid 308a of the pilot valve 308, which controls the pneumatic means for raising the molding elevator. The function of the limit switch L2 and of the check valve 322 and time delay reservoir 323 co-operating with the pneumatic relay valve 321 are identical as employed and previously described, in bringing the pouring elevator gently against the fixed stops 80 on the pouring end of the machine. Likewise the cam members 179 on the molding elevator Y force the lock pins 175 out of the path of the tray wheels.

As the pressure builds up in the molding cylinder, it overcomes the resistance of the counterweight 41 and rotates the shaft 35, which in turn rotates the levers 103 and rollers 104 from the position indicated by A to the position F (see Fig. 5). The tray of molds is thus pushed off the molding elevator and an empty tray is deposited upon the pouring elevator.

As the tray of molds is discharged, the lever 124, illustrated in Fig. 10, rotates from the full line position to its final position, which forces the shock absorber 110 from the full line position to the dotted line position.

Approximately at the position of the lever 103, indicated by B in Fig. 5, the arm 261 has rotated the lever 260 of the limit switch E (see Fig. 12) from the position E1 to the full line position, and by suitable spring means, the limit switch lever snaps into the dotted line position E2. The switch thus breaks the electrical circuit through the solenoids 307a and 308a, and establishes an electrical circuit for energizing the solenoid 306a of the lowering pilot valve 306. The electric circuit for the solenoid pilot valve 306 is from the positive power line 370 through the upper switch blade of relay switch 342, and line 381 to the solenoid 306a of the lowering pilot valve 306, thence through the line 395, switch E2 of the snap switch E on the molding elevator, the line 385, the intermediate switch blade of the relay switch 342 to the negative power line 371.

The hoisting pilot valves 307 and 308 permit the escape of the air from the pneumatic relay valves 317 and 321 and their co-operating time delay reservoirs. The air escapes rapidly by lifting the check in the check valves 319, 322 and through the ducts 312 and 314 and out of the exhaust ports of the pilot valves. In the meantime, the hoisting pilot valve 306 permits air under pressure to flow from the main air duct 300 through the duct 311 into the pneumatic relay valve 317, which, thus actuated, opens a communication between the main air ducts 300, 324 and the ducts 326, connected with the air lines 59 and 59a, leading to the lowering ends of the molding and pouring cylinders respectively. This forces the piston and piston rods 50 and 50a outwardly.

Before either elevator descends, the shifter levers 103 retract, that is to say, the shifter arm of the pouring elevator is rotated from the position D to the position A, illustrated in Fig. 5, and the shifter lever of the molding elevator rotates from the position F to the position A. The counterweights 41 connected by cables 37 to the drums 36 cause the shafts 35 to be rotated back to their normal position before either elevator starts on its downward excursion.

The pouring elevator, carrying a loaded tray, will descend ahead of the molding elevator and reaches the lowermost tier first. At this point the cross head 32a engages by means of the one way cam lever 273 the limit switch L8 and breaks the circuit through the relay coil 335, which controls a holding circuit for the switch L9.

When the molding elevator has lowered within a predetermined distance below the lowermost tier #1, the cam lever 271 on the cross head 32 closes the switch L7 momentarily which establishes an electrical connection from the positive power line 370 through the line 372 to the relay coil 336, thence through the line 397, the switch L7, the line 398, push button switch 363, the line 399, switch L5 in the pouring elevator, the line 400, the switch L6 adjacent the piston rod 50a and the lines 401 and 376 to the negative power line 371.

The relay magnet 336 is thus energized and closes its co-operating multiple switch 341, the lower switch blade of which shunts the line 402, between the relay coil 336 and the line 398, which serves as a holding circuit for the relay magnet 336.

The switch further makes an electrical connection through the solenoid winding 305a through the upper switch blade, connected with the positive line 370; the middle switch blade attached to the negative power line 371 and the wires 403 connecting the solenoid 305a to the co-operating switch contacts.

The valve of the pneumatic pilot valve is thus actuated to admit air from the high pressure lines 300, 303, to the lines 310, 292 and 166, communicating with the piston chambers 162, 291 which forces their respective stop pins outwardly, the lock pins 163, as illustrated in Fig. 7, are projected into the path of both elevator structures.

At this point the cams 17a, located at the molder's end of the machine only, are in engagement with the rollers 193 of the lock pins 192 of the molders elevator, which lock the drums 36.

Before the molding elevator Y reaches its lowest level, the companion arm 265 engages the abutment 267 in the molder's pit and rotates the arm 262 counter-clockwise, referring to the position of the parts shown in Fig. 12, and moves the lever 260 of the reversing switch E from the position E2 to the position E1, that is to say, it moves the switch from the elevator lowering position to the hoisting position.

This action breaks the circuit through the solenoid 311 and the air from the pneumatic relay valve 317 is exhausted through the exhaust port of the pilot valve 306. Likewise, the relay valve 317 closes the port from the main air duct 300 and opens the lowering end of the cylinders 51 and 51a to the atmosphere through the exhaust port.

Simultaneously, the solenoids 307a and 308a are energized, and again air under pressure is admitted through the hoisting pilot valves to the pneumatic relay valves 318 and 321 and both elevators are raised against the stop pins 163.

The shaft 35 of the molding elevator is locked against rotation, as above described, however, the shaft 35 of the pouring elevator X rotates and when the shifter arm roller has rotated to a position indicated by C in Fig. 5, the cam 256 engages and opens the switch L5 which controls the shunt winding through the relay switch 336. This opens the multiple switch 341 and breaks the electrical circuit through the solenoid 305a of the pilot valve 305 and the air from the elevator locks 162 is exhausted. However, the upward pressure of the elevators retain the stop pins 163 in the projected positions, illustrated in Fig. 7.

As the shifter arms of the pouring elevator have about completed their rotary movement and have discharged a tray into the lowest storage tier #1, that is to say, the position of the levers 103 are as at B at Fig. 5, the lever 251 upon the shaft 35 rotates the lever of the reversing switch W from the position W1 to the position W2.

This opens the electrical circuit through the solenoids 307a and 308a and the air is exhausted from the hoisting ends of the molding and joisting cylinders in the same manner as previously described.

The position of the switch W as indicated at W2 in the wiring diagram of Fig. 26 closes a circuit through the solenoid 306a of the pilot valve 306 as follows: From the positive power line 370 through the upper switch blade of the multiple switch 342, the line 381 to the solenoid 306a, thence through lines 395 and 405, reversing switch W2 of switch W, lines 406 and 385 to the middle switch blade of the multiple switch 342, which is connected with the negative power line.

The solenoid of the pilot valve 306 thus energized, actuates said pilot valve and in turn its associated relay valve 317 and air is admitted into the lowering ends of the cylinders 51 and 51a.

The shifter arms 103 now retract to their position A as shown in Fig. 5 by means of the counter-weights 41. The shaft 35 of the pouring elevator in its retrograde rotation, illustrated in the dotted arrow in Fig. 14, rotates the arm 252 until the member 252a engaging the switch lever of the switch W has rotated said switch lever from the position A2 to the position W1.

This results in opening of the electric circuit through the solenoid 306a of the pilot valve 306 exhausting air from the lowering ends of the cylinders and simultaneously energizing the solenoids 307a and 308a of the hoisting pilot valves 307 and 308, the circuits of which are above described.

Again air under pressure is admitted to the hoisting ends of the cylinders 51 and 51a.

However, the elevators have been permitted to descend sufficiently, by the delaying action of the check valves and time delay reservoirs, to clear the stop pins 163 and for said stop pins to be withdrawn by their springs out of the path of the elevators.

The empty pouring elevator X will be raised first and reach its selected intercepting point. As the pressure in the cylinder 51 builds up, it raises the loaded molding elevator Y. When the molding elevator reaches a predetermined level, the cam lever 270 on the cross head 32 closes the switch L10 and closes a circuit through the solenoid 305a from the positive power line 370 through the line 372 and interposed stop switches 356 and 358 to the solenoid 336, thence continues through the line 397 the switch L10, the lines 408 and 374, switch member 348 of the selector switch 346, line 375 and switch L8 through the line 376 to the negative power line.

The energized relay magnet again closes the multiple switch 341 and energizes the solenoid 305a which in turn actuates the pilot valve 305 and admits air under pressure to the stop pins 163 and particularly to the plunger pin 255 mounted above the path of the cross head 32 of the molding cylinder Y.

Note, that the holding circuit through the lower switch blade of the multiple switch 341 for the electro-magnet 336 is effective as previously described.

Referring to Figure 1, the air pressure forces the plunger 255 downwardly and rotates the pivoted bar 293 to assume the dotted line position. As will be seen in the above mentioned figure, the crosshead 32 of the molding elevator is provided with a Z-shaped abutment or stop 410 adapted to engage the pivoted bar 293 when in the dotted line position, and to clear it, when said bar is in the raised position shown in full lines.

Before the bar 293 is thrust into the dotted line position above described, the stop 410 on the cross head 32 has traveled to the left, referring to Fig. 1, a sufficient distance to pass beneath the bar 293. However, the stop 410 will overcome the pressure of the plunger and rotate the pivoted bar clockwise if the crosshead travels towards the left, should occasions arise to make it necessary.

Immediately after actuation of the switch L10, the limit switch L9 is opened by the cross head 32 and opens the holding circuit through the electro-magnet 337 and breaks the electrical connection through the switch 342, and thus deenergizes the solenoids 307a and 308a of the hoisting pilot valves 307, 308. The air from the lifting ends of both pistons 51 and 51a is exhausted through the exhaust ports of the pneumatic relay valves 318 and 321 and the elevators descend by gravity.

The molding elevator, being the heaviest, lowers rapidly and the crosshead of its hoisting cross head 32 is intercepted by means of the stop member 410 engaging the depressed latch bar 293. The molding elevator is thus held at the proper level for the molders. The pouring elevator also descends by gravity and on its way the cam lever 274 on the crosshead 32a opens the limit switch L6, and breaks the circuit through the electro-magnet 336, which in turn de-energizes the solenoid 305a of the pilot valve 305. Air from the stop pin housings is now exhausted through the exhaust port of the pilot valve 305 and the stop pins retract. The pouring elevator continues to drift until it engages the stops 171.

This completes a molding cycle. If necessity should arise, the operator may stop the elevator during operation by depressing the stop switch 356.

The pouring cycle will now be described. In order to change over from the molding cycle to the pouring cycle, the operator pushes the start button 355 which causes the elevators to be raised. As soon as the lock member 410 on the molding cross head 32 has cleared the latch bar 293, said bar is returned to its normal position, the raised position, by the spring 294. After the shifter arms 103 of the molding elevator have transferred the loaded tray upon the selected tier and simultaneously have deposited a loaded tray upon the pouring elevator X, the operator opens the selector switch 346 on the selector switch panel 345, which deenergizes the solenoids of the hoisting pilot valves 307 and 308 and both elevators drift to the first tier.

After both elevators are seated upon their respective stops 171, the operator closes the selector switch 347, which controls the pouring cycle and presses the push button switch 362 which closes a circuit through the electro-magnet 336 to close the relay switch 341. The electrical circuit extends from the positive power line 370 through the wire 372 and stop buttons 356, 358 to one side of the electro-magnet coil 336, thence from the other side of the coil through the line 397, push button switch 362, line 398, push button switch 363, line 399, switch L5, line 400, switch L6 and the lines 401, 376 to the negative power line 371.

The closed relay switch 341 energizes the solenoid 305a and the pilot valve 305 admits air into the ducts 310 and 166. The stop pins 163 are thus projected into the path of both elevators.

The operator then depresses the electric push button 361 which establishes an electrical circuit from the positive power line 370 through the line 372 and stop push buttons 356 and 358 to the electro-magnet 338, thence through the line 412, push button switch 361, lines 413, 414, 415, push button 360, line 416, limit switch L4, line 417 and switch member 353 of the pouring selector switch 347, which is in electrical communication with the negative power line 371.

The energized electro-magnet closes the relay switch 343 and closes a holding circuit through the lower switch blade and the line 414, shunting out the lines 412, 413 and the push button 361. The upper and intermediate switch blades of the relay switch 343 close an electrical circuit from the power lines 370, 371 and lines 418 and 419 respectively through the solenoid 309a.

The energized solenoids actuate the pilot valve 309 which opens communication between the main air ducts 300 and 303 and the duct 315, which in turn conveys air under pressure through the ducts 233 and 225 to the cylinders 230 and 220, respectively.

Interposed between the ducts 315 and 232 is a time delay reservoir with a restricted intake aperture to obtain a gradual pushing action of the piston rod 231 which pushes the weight carriage to the dotted line position, as illustrated in Fig. 22.

When not in operation the mold weights 201 are held in the raised position, for example, by a pin or pins 420 in a suitable bearing 421 on the weight carriage 215, engaging an aperture 422 in the link 224, shown in detail in Figures 22 and 23.

The operator then removes the lock pin 420 and pushes the push button 360 to release the air pressure in the cylinder 220 to enable the mold weights to come down upon the molds.

The electric push button 360 opens the circuit through holding circuit of the electromagnet 338 above described. The relay switch 343 opens and de-energizes the solenoid of the pilot valve 309.

After the molds are poured, the operator pushes the start button 357 to start the pouring cycle below described in detail.

The pouring cycle start button 357 completes an electrical circuit from the positive power line 370 through the line 272, including the interposed stop push buttons 356 and 358 to the electromagnet 337, thence through the lines 378 and 425, the start push button 357, the line 426, the switch member 351 of the pouring cycle selector switch 347, shunt line 427, line 375, limit switch L8 and the line 376 to the negative power line 371. The electro-magnet or relay 337, thus energized, closes the multiple relay switch 342, which in turn energizes the solenoids 307a and 308a of the pilot valves 307 and 308. As previously described, said pilot valves function to admit air under pressure through the ducts 58 and 58a to the hoisting ends of the elevator cylinders 51, 51a.

Both elevators are raised against the stop pins 163, aligning them with the lowermost tier #1 and by means of the action of the counterweights 41, the tray of poured molds of the pouring elevator X is discharged into the storage space of tier #1 which in turn pushes the tray at the far end of said tier upon the molding elevator Y. During its delivery into the storage space, the mold weights, resting upon the poured molds, carry the weight carriage 215 from the dotted line position of Fig. 22 to the full line position out of the path of the pouring elevator. The switch W is actuated by the arm 251 and moved from the position W1 to the position W2 of Fig. 14. The wiring diagrams of Fig. 26 illustrate the switch members W1 and W2 of the reversing switch W in Fig. 14.

The electric circuit for reversing and functioning of the pilot valves and co-operating relay valve are identical with that previously described in the molding cycle of the machine.

The switch L6, actuated by the cam 256 on the pouring elevator shaft 35 opens the holding circuit through the electro-magnet 336, which permits relay switch 341 to open, which in turn de-energizes the solenoid 305a. This causes the air in the housings 162 to escape; however, the pressure of the elevators prevents temporary retraction of the stop pins 163.

The air from the hoisting ends of the elevator cylinders 51 and 51a is exhausted and air under pressure conveyed to the lowering end of said cylinders. By means of the counterweights 41 the shaft 35 of the pouring elevator returns to its initial position and the arm 252 rotates the lever of the reversing switch W from the position indicated by W2 to the position W1, referring to the wiring diagram, that is to say, the switch member W2 is opened and the switch member W1 is closed in relation to their co-acting contacts. This opens the electrical circuit through the solenoid 306a of the lowering pilot valve 306 and closes the circuits through the solenoids of the hoisting pilot valves 307 and 308.

The time delay action of the check valves 319, 322 and the time delay reservoirs 320 and 323 permits the elevator to descend sufficiently to clear the stop pins 163, which then retract.

The elevators are raised in a manner identical with that described in the molding cycle, the empty pouring elevator reaches its selected tier first, followed by the loaded molding elevator. At the selected tier, the loaded tray of the molding elevator is discharged and an empty one is deposited upon the pouring elevator. The switch E is rotated from the position E1 to the position E2 and both elevators descend. When the pouring elevator X reaches the lowermost tier #1 the latch cams 273, 274 on the cross head 32a of the pouring elevator cylinder 51a actuate the switches L8 and L3 simultaneously. The limit switch L3 closes a circuit through the electro-magnet 338 from the positive power line 370 through the line 372 and push button 356, 358, to the electro-magnet 338, thence through the lines 412 and 430, switch L3, lines 431 and 415, push button 360, line 416, switch L4, line 417, switch member 353 of the pouring cycle selector switch 347 to the negative power line 371.

The energized relay closes its co-operating relay switch 343, the lower blade of which establishes a holding circuit. The upper and intermediate switch blades of the relay switch 343 energize the solenoid of the pilot valve 309, which in turn admits direct air under pressure into the mold weight cylinder 220 and gradually, by means of the time delay reservoir 330 into the mold weight carriage cylinder 230. The mold weights are raised off the mold, upon which they remained resting, before the air in the cylinder 230 forces the carriage towards the pouring end of the machine with the raised weights 201 positioned above the newly delivered molds. At this point, the cam member 234 engages the roller 235 and opens the limit switch L4 and breaks the above described electrical circuit through the electromagnet 338, which in turn de-energizes the solenoid 309a of the pilot valve 309. The air in the cylinders 220 and 230 is again open to exhaust through the exhaust port in said pilot valve, and the weights 201 lower by gravity upon the molds to be poured.

The limit switch L8, opened by its co-operating latch cam on the cross-head 32a breaks the holding circuit through the electro-magnet 337 above described. The relay switch 342 opens and energizes the solenoid 306a of the pilot valve 306.

It is obvious that the loaded pouring elevator reaches the lowermost tier #1 ahead of the molding elevator. As the molding elevator Y drifts by gravity to tier #1, it closes temporarily switch L7 which establishes an electrical circuit through the electro-magnet 336. The relay switch 341 closes and energizes the solenoid 305a of the pilot valve 305, and in addition closes the holding circuit through its co-operating electro-magnet 336.

As above described and illustrated in Figure 12, the switch arm 260 of the reversing switch E is returned at the end of descent of the molding elevator Y from the position E2, controlling the lowering of the elevators, to the position E1, controlling the hoisting of the elevators.

*The shake-out cycle.*—When the castings in the molds are ready to be taken out, the operator pushes push button 361, assuming that the pouring cycle selector switch 347 remained in closed position. The push button 361, which controls the relay 338 causes air under pressure to be admitted by the pilot valve 309 into the cylinder 220 and by means of the piston rod 223, the mold weights are lifted off the molds, until the parts of the mold weight assembly assume the full line position in Fig. 22. The operator then inserts the lock pin 420 into the aperture 422 in the lever 224 for holding them in inoperative or raised position, and depresses the push button 360, which functions to release the air pressure in the mold weight cylinder 220 and its carriage cylinder 230. He then manually forces the weight carriage into the storage space provided for it.

The operator now opens the pouring cycle selector switch 347 and closes the molding cycle selector switch 346. He further actuates the push button 363 to release the elevator lock pins 163 and depresses the starting button 355 at the molder's end of the device. The cycle and operation are the same as employed in the molding cycle and the molding elevator comes to rest at the molder's level, indicated diagrammatically in Fig. 28.

With reference to the stop pins 163a employed for selectively aligning the elevators with the rails 11 of the intermediate tiers, the plunger housings for said pins for each individual tier are preferably connected by ducts similar to the ducts 165 and 310 illustrated diagrammatically in Fig. 27. However, in place of a pilot valve, any suitable manually controlled shut-off valve may be employed for each set of stop pins, or all the sets may be controlled by a single multiple pneumatic valve, admitting air under pressure only to one set of plunger housings at a time.

It will be realized that whereas we have described and shown a practical and operative device, nevertheless many changes may be made in the size, shape, number and disposition of parts without departing from the spirit of our invention. We therefore wish our description and drawings to be taken as in a broad sense illustrative and diagrammatic rather than as limiting us to our specific showing.

It will be understood, for example, that whereas we have described the use of our apparatus and method in an intermittent molding and pouring sequence, it may be applied to the continuous pouring sequence. It will be understood also that many modifications or departures may be made in detail. We illustrate for example, trays 90 which are mounted on wheels. Any other suitable bearing or anti-frictional means may be employed, or the trays may under some circumstances be merely slid along smooth guides.

Our invention involves not merely the mechanism herein described, but the mold forming and pouring method herein described. Our method is applicable not only to an intermittent but to a continuous pouring cycle. An important feature of our method is the storage of molds on different tiers or at different levels or storage zones, the delivery of molds selectively from these various tiers to the pouring point, the automatic positioning of weights on the unpoured molds, in preparation for pouring, the automatic removal of the weights from the molds after the metal in the mold has cooled slightly, the transfer of the molds to storage for cooling, the return of cooled molds from storage to a suitable shake-out point, and the return of follow-boards and empty flasks to the holder for use.

In the present application we have not gone into detail on points which are part of general foundry practice. It will be understood, for example, that we do not wish to be limited to the employment of a flask and mold. The flask may accompany the mold, or may be removed, and a band slipped outside the mold. Sometimes molds may be made up and poured with the flask or band merely being placed on a follow board. These instances are pointed out to emphasize the flexibilty of our method and the wide possibilities of use of our apparatus.

We claim:

1. In a conveying device, a supporting structure, a plurality of vertically aligned tiers of supporting guides mounted upon said structure, an elevator mounted on said structure, and including supporting portions alignable with said guides, means for actuating said elevator, a plurality of transfer supports positioned upon the guides of each tier, means for selectively stopping said elevator in alignment with the supporting guides of the various tiers, means for expelling transfer supports from said elevator including a shaft rotatably mounted upon said elevator about a horizontal axis, transfer support engaging levers in response to rotation of said shaft, and means for preventing undesired rotation of said shaft.

2. In a conveying device, a supporting structure, a plurality of vertically aligned tiers of supporting guides mounted upon said structure, an elevator mounted on said structure, and including supporting portions alignable with said guides, means for actuating said elevator, a plurality of transfer supports positioned upon the guides of each tier, means for selectively stopping said elevator in alignment with the supporting guides of the various tiers, means for expelling transfer supports from said elevator including a shaft rotatably mounted upon said elevator about a horizontal axis, transfer support engaging levers in response to rotation of said shaft, and means for preventing undesired rotation of said shaft, said shaft being rotatable about a horizontal axis, said levers being rotatable about vertical axes.

3. The method of pouring molds which includes maintaining a plurality of molds formed and ready for pouring in a plurality of storage zones situated at various levels, withdrawing formed molds successively from one of said levels, moving them in succession through a pouring zone, pouring the molds while in said pouring zone, moving the poured molds successively back to the level from which the formed but unpoured molds are being withdrawn, and meanwhile making space for said poured molds by the withdrawal of the formed molds to the pouring zone, and repeating the sequence of the removal of the formed molds and the return for storage of the poured molds, through another storage zone level when one level is completed.

4. The method of pouring molds which includes maintaining a plurality of molds formed and ready for pouring in a plurality of storage zones situated at various levels, withdrawing formed molds successively from one of said levels, moving them in succession through a pouring zone, pouring the molds while in said pouring zone, moving the poured molds successively back to the level from which the formed but unpoured molds are being withdrawn, and meanwhile making space for said poured molds by the withdrawal of the formed molds to the pouring zone, and repeating the sequence of the removal of the formed molds and the return for storage of the poured molds, through another storage zone level when one level is completed, and maintaining weights on said formed molds during the pouring period.

5. In a conveying device, a supporting structure, a plurality of vertically aligned tiers of supporting guides mounted upon said structure, an elevator at each end of said structure, including supporting portions alignable with said guides, means for actuating said elevators, a plurality of transfer supports adapted to be positioned upon the guides of said tiers, means for aligning said elevators horizontally at the opposite ends of the individual tiers, whereby when one elevator is aligned with one end of a given tier, the other elevator is aligned with the opposite end of said tier, and means for stopping one of said elevators at a station out of alignment with any tier, and for at the same time aligning the opposite elevator with the lowest tier.

6. In a conveying device, a supporting structure, a plurality of vertically aligned tiers of supporting guides mounted upon said structure, an elevator at each end of said structure, including supporting portions alignable with said guides, means for actuating said elevators, a plurality of transfer supports adapted to be positioned upon the guides of said tiers, means for aligning said elevators horizontally at the opposite ends of the individual tiers, whereby, when one elevator is aligned with one end of a given tier, the other elevator is aligned with the opposite end of said tier, and means for moving said transfer supports in one direction on some tiers, and in the opposite direction on another tier, and a weight adapted to be positioned above the transfer supports on one of said tiers and means for moving said weight in unison with said supports.

7. In a conveying device, a supporting structure, supporting guides on said structure, transfer supports positioned upon said guides and adapted to receive articles being handled by said conveying device, an elevator at each end of said fixed support, means for actuating said elevators, said transfer supports being movable from said elevators to said guides and from said guides to said elevators, an electric circuit for said elevator actuating means and a reversing switch on one of said elevators, included in said circuit, and means for positioning said switch in hoisting position when said elevator is at its lowest level and for positioning said switch in lowering position after the elevator has risen.

8. In a conveying device, a supporting structure, supporting guides on said structure, transfer supports positioned upon said guides and adapted to receive articles being handled by said conveying device, an elevator at each end of said fixed support, means for actuating said elevators, said transfer supports being movable from said elevators to said guides and from said guides to said elevators, an electric circuit for said elevator actuating means and a reversing switch on one of said elevators, included in said circuit, and means for moving said switch into hoisting position in response to predetermined downward movement of the elevator.

9. In a conveying device, a supporting structure, supporting guides on said structure, transfer supports positioned upon said guides and adapted to receive articles being handled by said conveying device, an elevator at each end of said fixed support, means for actuating said elevators, said transfer supports being movable from said elevators to said guides and from said guides to said elevators, an electric circuit for said elevator actuating means and a reversing switch on one of said elevators, included in said circuit, and means for positioning said switch in lowering position in response to upward movement of the elevator.

10. In a conveying system, a supporting structure, a plurality of vertically alined tiers of supporting guides mounted on said structure, an elevator at each end of said structure, and means for positioning said elevators at the same time in horizontal alinement with the opposite ends of a tier, each elevator including portions alineable with said guides, a plurality of transfer supports positioned upon the guides of each tier, said transfer supports abutting and being sufficient in number substantially to fill each tier, an additional transfer support positioned upon one of said elevators, and means mounted on and movable with said elevator for ejecting said transfer support from said elevator and for thereby moving the entire series of supports upon the tier with which the elevators are alined, whereby the terminal support at the opposite end of the tier is positioned upon the second elevator.

11. In a conveying device, a supporting structure, a plurality of vertically alined tiers of supporting guides mounted upon said structure, an elevator at each end of said structure, including supporting portions alineable with said guides, means for actuating said elevators, a plurality of transfer supports adapted to be positioned upon the guides of said tiers, means for simultaneously alining said elevators horizontally at the opposite ends of a tier whereby, when one elevator is alined with one end of a given tier, the other elevator is alined with the opposite end of said tier, means for moving said transfer supports along the tier with which the elevators are alined, when the elevators are alined with said tier, a weight, and means for positioning it upon the articles conveyed, and for moving it with said articles along said tier.

12. In a conveying device, a supporting structure, a plurality of vertically alined tiers of supporting guides mounted upon said structure, an elevator at each end of said structure, including supporting portions alineable with said guides, means for actuating said elevators, a plurality of transfer supports adapted to be positioned upon the guides of said tiers, means for simultaneously alining said elevators horizontally at the opposite ends of a tier whereby, when one elevator is alined with one end of a given tier, the other elevator is alined with the opposite end of said tier, means for moving said transfer supports along the tier with which the elevators are alined, when the elevators are alined with said tier, a weight, means for positioning it upon the articles conveyed, and for moving it with said articles along said tier, and means for lifting said weight from said articles and for returning it to initial position.

13. In a conveying device, a supporting structure, a vertically aligned tier of supporting guides mounted thereon, an elevator operably associated with the guides of said tier at one end thereof, means for moving the elevator into alignment with one end of a selected guide of said tier, a plurality of article transfer supports movable upon the guides, means for moving said transfer supports along said guides and to and from said elevator, a plurality of weights, means for positioning said weights upon said article transfer supports while the latter are in position upon the elevator, and means for subsequently moving the weights in unison with the associated article transfer supports on the elevator onto an aligned guide.

14. In a conveying device, a supporting structure, a vertically aligned tier of supporting guides mounted thereon, an elevator operably associated with the guides of said tier at one end thereof, means for moving the elevator into alignment with one end of a selected guide of said tier, a plurality of article transfer supports movable upon the guides, means for moving said transfer supports along said guides and to and from said elevator, a weight carrier, means for reciprocating the same with respect to and in alignment with one of said guides, a plurality of weights carried by said weight carrier, and means for depositing the weights upon article transfer supports while in position upon an elevator aligned with said guide for movement in unison with said article transfer supports from the elevator to said aligned guides, and means to lift the weights from said transfer supports for return to normal position.

15. In a molding plant, a supporting structure, a plurality of vertically aligned guides, an elevator operatively associated with one end of said guides, means for moving the elevator into alignment with any of said guides, a mold transfer support movable along said guides and to and from the elevator, a movable weight carrier, a weight carried thereby, means for moving the weight carrier to position the weight carried thereby in alignment with a mold carried by the mold transfer support while the latter is in position upon the elevator, means for depositing the weight upon the mold carried by said transfer support and means for subsequently moving the weight and mold transfer support in unison from the elevator onto an aligned guide and for then lifting the weight from said mold.

16. In a conveying device, a supporting structure, a plurality of vertically aligned tiers of supporting guides mounted upon said structure, an elevator at each end of said structure, including supporting portions alignable with said guides, means for actuating said elevators, a plurality of transfer supports adapted to be positioned upon the guides of said tiers, automatically operative means for aligning said elevators horizontally at the opposite ends of the individual tiers, whereby when one elevator is aligned with one end of a given tier, the other elevator is aligned with the opposite end of said tier, and additional means for stopping one of said elevators at a station above the lowest tier, and for at the same time aligning the opposite elevator with the lowest tier.

17. In a conveying device, a supporting structure, a plurality of vertically aligned tiers of supporting guides mounted upon said structure, an elevator at each end of said structure, including supporting portions alignable with said guides, means for actuating said elevators, a plurality of transfer supports adapted to be positioned upon the guides of said tiers, automatically operative means for aligning said elevators horizontally at the opposite ends of the individual tiers, whereby when one elevator is aligned with one end of a given tier, the other elevator is aligned with the opposite end of said tier, and additional means for stopping said elevators at stations out of alignment with each other.

18. In a conveying device, a supporting structure, supporting guides, an elevator operably associated with said guides at one end thereof, means for moving the elevator into alignment with said guides, a plurality of article transfer supports movable upon the guides, and means for moving said transfer supports along said guides to and from said elevator, a weight, means for positioning said weight upon said article transfer supports while the latter are in position upon the elevator, and means for subsequently moving the weight in unison with the associated article transfer supports onto an aligned guide.

19. In a conveying device, aligned guides, transfer supports thereon, means for imparting unidirectional movement to said transfer supports along said guides, a weight, means for positioning said weight upon said transfer supports and for moving it therewith during a portion of said unidirectional movement, and means for reciprocating said weight to its initial position and for again moving it with said transfer supports.

GEORGE O'CONNOR.
WILLIAM MORLEY.
CHARLES F. SCHOELM.